(12) United States Patent
Berk et al.

(10) Patent No.: US 11,270,248 B2
(45) Date of Patent: *Mar. 8, 2022

(54) SYSTEM FOR DYNAMIC EFFORT-BASED DELIVERY VALUE PREDICTIVE UPDATES

(71) Applicant: DoorDash, Inc., San Francisco, CA (US)

(72) Inventors: Jonathan Berk, San Francisco, CA (US); Jessica Lachs, San Francisco, CA (US); William Preston Parry, Akron, OH (US)

(73) Assignee: DoorDash, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,831

(22) Filed: Dec. 18, 2020

(65) Prior Publication Data

US 2021/0142274 A1    May 13, 2021

Related U.S. Application Data

(63) Continuation of application No. 15/908,344, filed on Feb. 28, 2018, now Pat. No. 10,915,853.

(51) Int. Cl.
*G06Q 10/08* (2012.01)
*G06Q 50/12* (2012.01)
*G06N 20/00* (2019.01)

(52) U.S. Cl.
CPC ......... *G06Q 10/0833* (2013.01); *G06N 20/00* (2019.01); *G06Q 10/0832* (2013.01); *G06Q 50/12* (2013.01)

(58) Field of Classification Search
CPC .......... G06Q 50/12; G06N 3/02; G06N 5/003; G06N 20/00

(Continued)

(56) References Cited

U.S. PATENT DOCUMENTS 10,078,337 B1 *  9/2018  Yao ................ G05D 1/0287
10,262,281 B1     4/2019  Vitek et al.

(Continued)

OTHER PUBLICATIONS

Li et al., Scaling Machine Learning as a Service, 2016, JMLR: Workshop and Conference Proceedings 67: 15-29 (Year: 2016).*

(Continued)

*Primary Examiner* — Shannon S Campbell
*Assistant Examiner* — Jessie James Shafer
(74) *Attorney, Agent, or Firm* — Kwan & Olynick LLP

(57) ABSTRACT

Described are systems and processes for generating dynamic effort-based delivery value predictions for real-time delivery of perishable goods. In one aspect, a system is configured for generating dynamic delivery value predictions for delivery opportunities provided to couriers. For each order, delivery events and corresponding timestamps are received from devices operated by customers, restaurants, and couriers. Based on the timestamps, the system generates a predicted delivery duration with trained predictive models that use weighted factors such as order data and historical restaurant data. A service value for the delivery of the order is determined based the predicted delivery duration and a predetermined active time value. The service value is then transmitted along with the corresponding delivery opportunity to a user device of a courier. The determined service values may be adjusted based on courier acceptance rates of delivery opportunities and other factors such as customer experience.

20 Claims, 14 Drawing Sheets

(58) Field of Classification Search
USPC .......................................................... 705/333
See application file for complete search history.

(56) References Cited

U.S. PATENT DOCUMENTS

| | | |
|---|---|---|
| 2002/0188492 A1 | 12/2002 | Borton |
| 2013/0246207 A1 | 9/2013 | Novak et al. |
| 2017/0154348 A1* | 6/2017 | Biswas .............. G06Q 30/0206 |
| 2019/0107404 A1 | 4/2019 | Zhong et al. |
| 2019/0130350 A1* | 5/2019 | Nguyen ............. G06Q 10/0834 |

OTHER PUBLICATIONS

Hermann et al., Meet Michelangelo: Uber's Machine Learning Platform, Sep. 5, 2017, Uber Engineering, pp. 1-14 (Year: 2017).*
U.S. Appl. No. 15/908,344, Office Action Appendix, dated Jul. 21, 2020, 3 pgs.
U.S. Appl. No. 15/908,344, Non-Final Rejection, dated Apr. 16, 2020, 34 pgs.
U.S. Appl. No. 15/908,344, Notice of Allowance And Fees Due (Ptol-85), Oct. 20, 2020, 15 pgs.
Jeremy Hermann and Mike Del Balsa, Meet Michelangelo: Uber's Machine Learning Platform, (Sep. 5, 2017), Uber Engineering (Year: 2017).
Technological Disruption and Innovation in Last Mile Delivery, GSB.Stanford.Edu/R/VCII, Jun. 2016, 26 pgs.

* cited by examiner

SYSTEM FOR DYNAMIC EFFORT-BASED DELIVERY VALUE PREDICTIVE UPDATES

CROSS-REFERENCE TO RELATED APPLICATIONS

This application is a continuation of U.S. patent application Ser. No. 15/908,344 entitled: "SYSTEM FOR DYNAMIC EFFORT-BASED DELIVERY VALUE PREDICTIVE UPDATES" filed on Feb. 28, 2018, which is incorporated herein by reference in its entirety for all purposes.

TECHNICAL FIELD

The present disclosure relates to a system for facilitating a real-time, on-demand delivery logistics platform for perishable goods. In one example, the present disclosure relates to mechanisms and processes for dynamic valuations of deliveries.

BACKGROUND

Delivery logistics platforms rely on alignment of incentives between couriers, customers, and merchants. Unfortunately, conventional mechanisms for valuation of deliveries may undervalue or overvalue deliveries and cause couriers to decline deliveries. This reduces overall system efficiencies and causes inconsistent driver compensation relative to the time and effort involved.

Consequently, it is desirable to provide improved mechanisms for determining a value of a particular delivery, particularly with respect to real-time on-demand delivery of perishable goods.

SUMMARY

Provided are various mechanisms and processes for generating dynamic effort-based delivery value predictions for real-time delivery of perishable goods. Various embodiments are described for generating dynamic delivery value predictions for delivery opportunities provided to couriers. In one aspect, which may include at least a portion of the subject matter of any of the preceding and/or following examples and aspects, a server is configured to generate dynamic delivery value predictions for real-time deliveries of perishable goods.

The server comprises an interface configured to receive one or more events corresponding to a real-time delivery of an order for perishable goods. The one or more events includes a plurality of time stamps. The server further comprises memory configured to store the one or more events for the order and other orders.

The server further comprises a processor configured to dynamically generate a predicted delivery duration for a delivery event for the order based on the one or more events for the order and a plurality of weighted factors including one or more of the following: time, date, weather, data on the dishes in the order, and historical courier performance. The processor is further configured to determine a service value for the real-time delivery of the order based on the predicted delivery duration and a predetermined active time value.

The processor may be configured to dynamically generate the predetermined active time value based on a location corresponding to one or more of the plurality of events. The processor may be configured to dynamically generate the predetermined active time value based on courier acceptance rates for a location corresponding to the plurality of events. The predetermined active time value may be dynamically adjusted based on time of day.

The processor may further be configured to dynamically generate a supplemental value amount based on the plurality of weighted factors. The service value may be adjusted by the supplemental value amount. The service value is provided to the courier at a user device corresponding to the courier.

The processor may be associated with a gradient boosted machine. As such, the processor dynamically generates the service value by continuously training a model using the plurality of weighted factors. The plurality of weighted factors may further include one or more of the following: a sub-total of the order and the number of orders at the restaurant.

The plurality of events include: a first event and a first timestamp corresponding to placement of the order at the restaurant by a customer; a second event and a second timestamp corresponding to confirmation of receipt of the order by the restaurant; a third event and a third timestamp corresponding to confirmation of completion of the order by the restaurant; a fourth event and a fourth timestamp corresponding to pickup of the order by a courier; and a fifth event and a fifth timestamp corresponding to completion of delivery of perishable goods to the customer. Various events in the plurality of events are received from one or more of the following: the courier, the restaurant, and the customer.

Other implementations of this disclosure include corresponding devices, systems, and computer programs, as well as and associated methods for dynamically predicting delivery service values. These other implementations may each optionally include one or more of the following features. For instance, provided is a programmable device configured for generating dynamic delivery value predictions for real-time delivery of perishable goods using a predictive machine learning model. The programmable device is configured to operate in a training mode and an inference mode.

In the training mode, the programmable device is configured to pass a dataset into the predictive model. The dataset includes a series of successive training events with corresponding known time durations between events. In the training mode, the programmable device is further configured to train the predictive model to accurately and dynamically output predicted delivery durations. Training the predictive model may include inputting different combinations of events and time durations, and comparing actual time of arrivals (ATAs) with generated delivery duration predictions to allow for the predictive model to automatically and iteratively adjust weighted factors in the predictive model.

In the inference mode, the programmable device is configured to pass a first event predicted delivery duration may then be automatically generated based on trained weighted factors. In the inference mode, the programmable device is further configured to determine a service value for the real-time delivery of the order based on the first predicted delivery duration and a predetermined active time value.

The programmable device may be configured to dynamically generate the predetermined active time value based on a location corresponding to one or more of the plurality of events. The processor may be configured to dynamically generate the predetermined active time value based on courier acceptance rates for a location corresponding to the plurality of events. The predetermined active time value may be dynamically adjusted based on time of day.

The programmable device may further be configured to dynamically generate a supplemental value amount based on the plurality of weighted factors. The service value may be adjusted by the supplemental value amount. The service value is provided to the courier at a user device corresponding to the courier.

The programmable device may dynamically generate the service value by continuously training the predictive model using the plurality of weighted factors.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
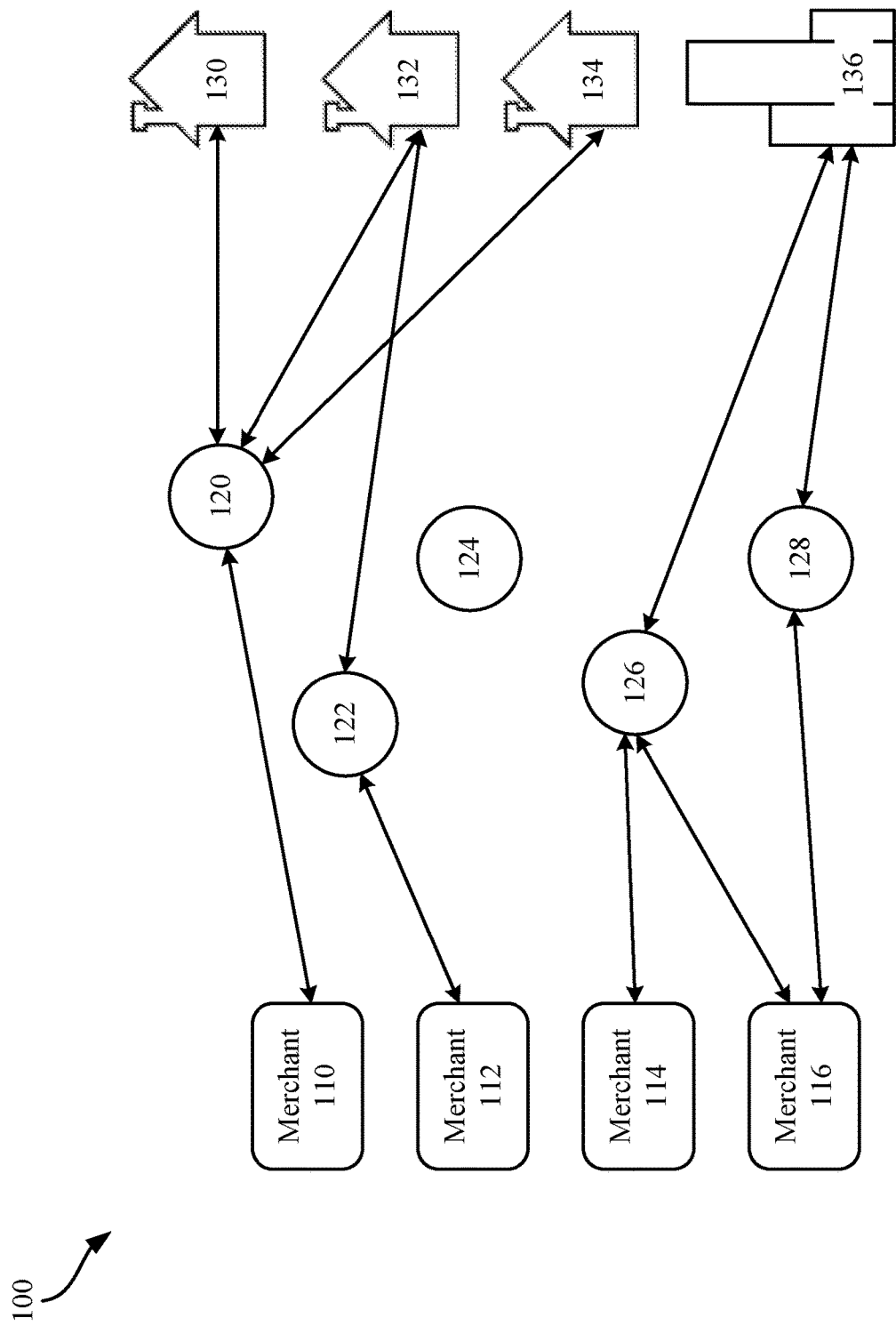
FIG. 1 illustrates one example of a delivery platform system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present disclosure may be described in the context of determining delivery service values which may correspond to the effort and time required to complete a delivery routed by a delivery logistics platform. However, it should be noted that the techniques of the present disclosure may also be applied to the determination of values for various other services or activities related to the logistics platform, such as logistics management values, order item values, perishable good preparation values, restaurant management values, and transportation values. As another example, the techniques of the present invention will be described in the context of particular protocols, such as Wi-Fi or Bluetooth. However, it should be noted that the techniques of the present disclosure may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, real-time on-demand delivery logistics platforms managing real-time on-demand deliveries of perishable goods rely on accurate valuation of delivery services in order to maintain an acceptable acceptance rate amongst couriers for delivery opportunities. As used herein, the term "delivery logistics system" may be used interchangeably with the terms "logistics platform" or "delivery platform." In particular, a given delivery platform may want a high acceptance rate of delivery opportunities by couriers to maintain efficient routing of deliveries from merchants to customers. Customers and merchants want convenient delivery of perishable goods in the shortest amount of time. However, couriers are incentivized to maximize compensation for a delivery for the least amount of time or effort involved. As used herein, the term "provider" may be used to describe various types of merchants that provide goods, including perishable goods, and the terms "provider" and "merchant" may be used interchangeably. As used herein, the term "delivery associate" may be used to describe a driver or courier that delivers the goods provided by the merchant to a customer, and the terms "delivery associate" and "courier" may be used interchangeably.

Current systems for determining delivery values do not sufficiently align incentives of the couriers with those of the merchants and customers, as well as those of the delivery platform. For example, many delivery opportunities may be declined by a courier where the base pay for a delivery is the same for all deliveries in a given market location causing compensation for more difficult deliveries to be undervalued. In some cases, couriers would selectively choose to accept only delivery opportunities with larger orders due to a higher likelihood of substantial gratuity. This also caused many smaller order delivery opportunities to be declined. This may also result in high volatility and inconsistency in courier compensation. Existing systems are also inflexible and may not provide a structure which allows testing to optimize delivery valuation around a supply and demand equilibrium, or implementation of adjustments to the model.

Overview

Accordingly, the present disclosure describes various examples of delivery tracking and pairing systems and processes that provide ways of more accurately determining the value of a delivery by associating the value with delivery effort. In some examples, a delivery tracking system generates ETA predictions using a predictive event model that implements machine learning to evaluate weighted factors. In some embodiments, the predictive event model may implement a neural network. In other embodiments, the predictive event model may be a gradient boosted machine or gradient boosted decision tree.

In some embodiments, real-time status updates of events corresponding to a delivery may be provided as input into the predictive event model to refine ETA computations. Furthermore, various parameters may be received in real-time and input as weighted factors to continually update the ETA. In some embodiments, the predictive event model may iteratively update various computational layers based on the real-time status updates of events. In some embodiments, the predictive event model may iteratively update various decision trees and corresponding error measurements. In some embodiments, the improved delivery tracking system may generate ETA predictions of the various events that occur during a delivery from order placement to delivery completion.

The predicted ETA time duration for completion of a delivery of an order may correspond to a predicted delivery duration for completion of the order. The predictive delivery duration may then be used to determine a delivery service value for the delivery opportunity offered to a courier. The delivery service value may also take into account a predetermined active time value for a given location and time. In some embodiments, the predetermined active time value may be determined using a service valuation model in a delivery routing system. The service valuation may also implement a gradient boosted machine or a gradient boosted decision tree. In other embodiments, the service valuation implements a neural network with various computational layers.

In some embodiments, the delivery routing system tracks the courier acceptance rate of the system for a given location and time. Various metrics may be used to determine the courier acceptance rate. For example, the courier acceptance rate may correspond to the average number of delivery opportunities that are declined for a given location and time. In other embodiments, the courier acceptance rate may correspond to the average amount of time between the creation of an order and acceptance of the delivery opportunity for such order. In yet other embodiments, the courier acceptance rate may correspond to the average amount of time between the transmittal of the delivery opportunity to the courier device and the acceptance of the delivery opportunity for such order. The routing system then determines whether the current courier acceptance rate is at a desired threshold rate.

Delivery parameters corresponding to the orders may be input into the service valuation model as weighted factors to dynamically adjust the active time value, and thus the delivery service values for subsequent delivery opportunities, to increase or decrease the courier acceptance rate of delivery opportunities. In some embodiments, a supplemental value may also be determined to adjust the determined delivery service value. For example, a supplemental value may ensure that the delivery service value remains within a range between a floor value and a ceiling value. As another example, a supplemental value may be added to the delivery service value based on the number of order items, the weight of order items, distance of travel, etc. In other embodiments, a supplemental value may be used to adjust the predicted courier acceptance rate for particular orders, such as for delayed deliveries or orders for new customers.

This approach more closely links the delivery value with the effort required to complete the delivery and results in compensation that is more aligned with the work associated with each delivery. Linking delivery value with effort results in one or more improvements over existing systems and mechanisms. First, the incentives of the couriers are more aligned with those of the merchants and customers by preventing couriers from selectively choosing larger orders over smaller orders, which would reduce volatility in compensation for deliveries across all couriers.

This approach would also increase courier acceptance rates, which results in improved overall efficiency, and less down time between orders. It also provides a dynamic means of adjusting courier acceptance rates by automatically determining an improved active time value.

Example Embodiments

With reference to FIG. 1, shown is an example of a delivery platform system 100 having multiple merchants, couriers, and customers, in accordance with one or more embodiments. In the present example, the delivery platform system 100 provides real-time, on-demand, delivery of perishable goods. For instance, a customer may order food from a restaurant by using a mobile device application that places the order through the delivery platform. In some instances, the user may also access the delivery platform through the internet via a computer, laptop, tablet, etc. When the customer orders the food through the delivery platform, the order is prepared at a provider site, where a delivery associate will then pick up the order and deliver the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and delivery platform in the context of restaurants and food delivery, the mechanisms and processes described herein may also be applied to the delivery of various other perishable and non-perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the delivery platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
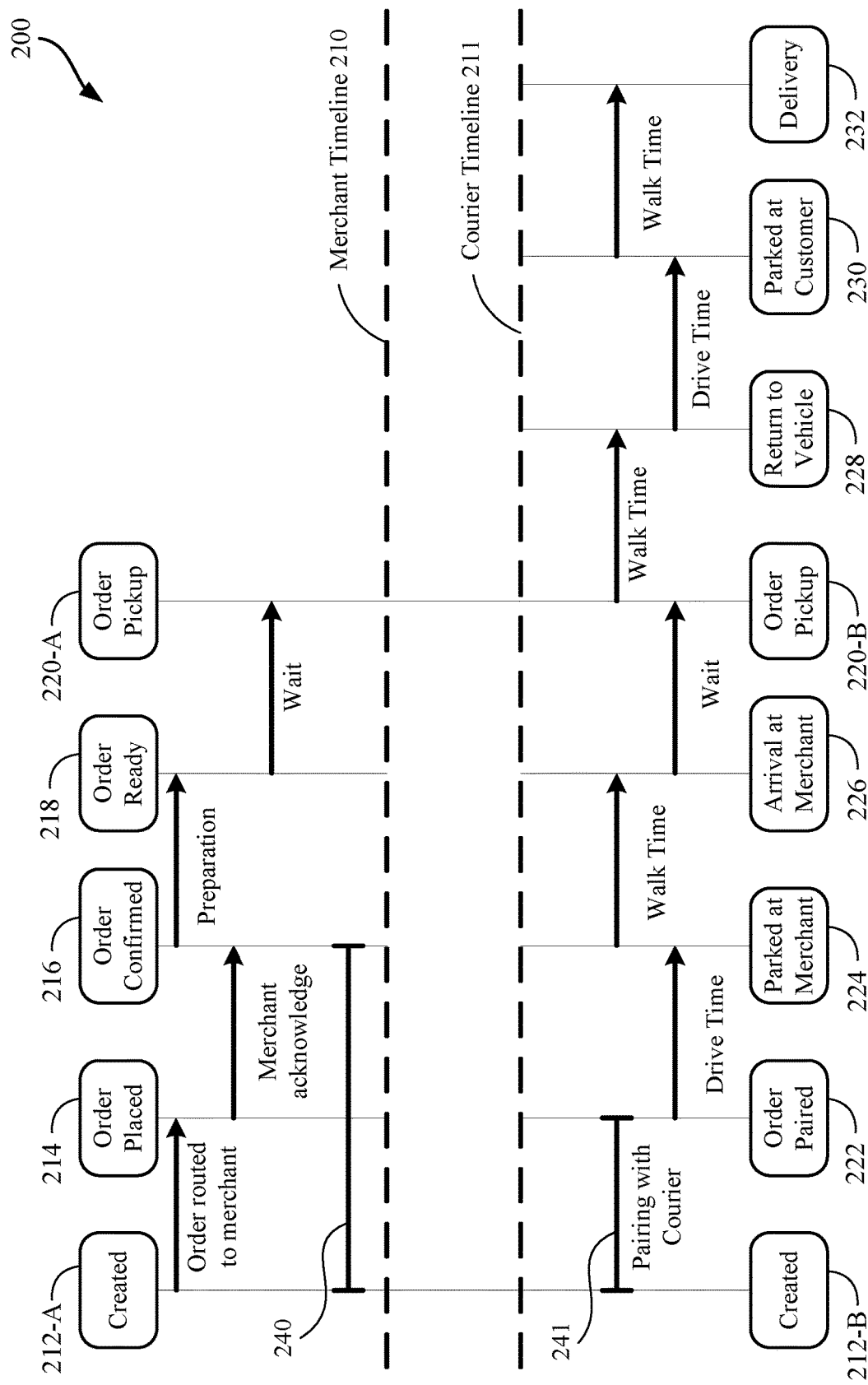
FIG. 2 illustrates an example timeline of delivery events associated with real-time on-demand delivery of perishable goods, in accordance with one or more embodiments.

With reference to FIG. 2, shown is an example timeline 200 of delivery events associated with real-time on-demand delivery of perishable goods, in accordance with one or more embodiments. Timeline 200 depicts the various events that occur when an order is placed by a customer on a merchant timeline 210 and a courier timeline 211. In various embodiments, a merchant timeline or courier timeline may include additional or fewer events than depicted in FIG. 2. In various embodiments, the events in timeline 200 may be tracked via transmission between a server system and a client devices associated with one or more couriers, merchants, and/or customers, which may be further described with reference to FIG. 3. As used herein, client devices associated with customers may be referred to as "customer devices," client devices associated merchants may be referred to as "merchant devices," and client devices associated with couriers may be referred to as "courier devices." The server system may implement a dynamic ETA estimation system as further described herein.

The events that occur on a merchant timeline 210 may include order creation 212-A, order placement 214, order confirmation 216, order ready 218, and order pickup 220-A. An order creation 212-A may occur when the system receives an order created by a customer. The order may be received at the server system. The order may then be routed to the designated merchant. In some embodiments, the order is routed to the designated merchant by transmitting information corresponding to the order from the server to a merchant device.

The order placement 214 event may occur when the order is received at the merchant device. In some embodiments, the merchant may acknowledge the receipt of the order by transmitting a confirmation, which may trigger the order confirmation 216 event. Order confirmation 216 may signal that preparation of the order has begun by the merchant. In some embodiments, the period of time between order creation 212-A and order confirmation 216 is known as kitchen latency 240.

An order ready 218 event may then occur when preparation of the items in the order is completed and the order is ready for pickup by a courier. Event 218 may be triggered by a merchant confirmation that the order is ready. Such confirmation may be transmitted by the merchant device to the server. The merchant may then wait for a courier to arrive for pickup of the order. When a courier arrives and picks up the order, the order pickup 220-A event occurs. This event may also be triggered by a merchant confirmation that the courier has received the order.

In some embodiments, the events that occur on a courier timeline 211 may overlap or correspond with one or more events on a merchant timeline 210. The events on courier timeline 211 may include order creation 212-B, order pairing 222, parked at merchant 224, arrival at merchant 226, order pickup 220-B, return to vehicle 228, parked at customer 230, and order delivered 232.

In some embodiments, order creation 212-B may correspond to order creation 212-A, and may occur when the system receives an order created by a customer as in event 212-A. In some embodiments, event 212-A and 212-B may be the same event. The system may then pair the order to a courier, thereby triggering order pairing 222. In some embodiments, order pairing 222 may be triggered by confirmation of acceptance of a delivery opportunity for the order by the courier. The system may transmit a notification to a courier device corresponding to the courier. In some embodiments, the period of time between order creation 212-B and order pairing 222 may be known as pairing latency 241. As used herein, an order pairing or delivery pairing may refer to the pairing of an order with a courier and providing the courier with a delivery opportunity to deliver the order to the corresponding delivery destination, which may be accepted or declined by the courier.

When order pairing 222 occurs may depend on various factors, including the distance of the courier from the merchant, the travel time of the courier to the merchant, traffic, time of day, etc. In some embodiments, order pairing 222 may not occur until the order has been confirmed by the merchant at 216 or is being prepared by the merchant. In some embodiments, order pairing 222 may not occur until the merchant has confirmed that the order is ready for pickup at 218.

Once an order is paired at 222, the courier may travel to the merchant location to pick up the order. The courier may then pick up the order upon arrival at the merchant location, and trigger order pickup 220-B. Event 220-B may correspond to order pickup 220-A. In some embodiments, event 220-A and 220-B may be the same event. In some embodiments, event 220-B may be triggered by a courier confirmation that the courier has received the order from the merchant.

In some embodiments, the system may attempt to pair orders and route couriers such that the arrival at merchant 226 coincides with order ready 218. This may optimize the actions of the courier and the merchant to minimize down time, which may occur where courier arrives before the merchant has completed the order, or where the merchant has completed the order before the courier arrives.

In some embodiments, additional events may be tracked between the order pairing 222 and the arrival at merchant 226. For example, the courier may travel to the merchant location by vehicle and then park her vehicle in an appropriate location to reach the merchant. In some embodiments, the courier may confirm that the vehicle is parked by transmitting the confirmation from the courier device to the server, thereby triggering parked at merchant 224. The courier may then have to walk or otherwise travel from the parking location to the merchant. An arrival at merchant event 226 may also occur when the courier has arrived at the merchant location. A confirmation of the courier's arrival may be sent by the courier device and/or the merchant device. In various embodiments, tracking these additional events may provide more accuracy of ETA predictions between order pairing 222 and arrival at merchant 226.

In some embodiments, the courier may have to wait for the order to be completed. After order pickup 220-B, the courier may then travel to the customer location to complete delivery of the order at order delivery 232. Order delivery 232 may occur when the order has been given to the customer. Order delivery 232 may be triggered by confirmation of the delivery by the customer or the courier via corresponding devices.

In some embodiments, additional events may be tracked between the order pickup 220-B and the order delivery 232. For example, the courier may confirm the return to a vehicle after order pickup 220-B at the merchant location. This may be done via confirmation transmitted from the courier device to the server. In some embodiments, confirmation may be manually input or automatically detected via a proximity beacon. For example, the systems used to determine the location of a courier may implement Bluetooth Low Energy (BLE) beacons and BLE-enabled devices that are capable of detecting signals emitted by the BLE beacons.

By using BLE beacons and devices, the system can provide more accurate location information of a delivery associate and can avoid the drawbacks of GPS, cell tower triangulation, and manual location entry. Specifically, the system can be used when there are weak or nonexistent GPS or cell signals. The system also detects location automatically without requiring any input from a delivery associate. As described in examples of various mechanisms and processes herein, the use of BLE beacons and BLE-enabled devices to provide location services yields increased efficiency and accuracy, in addition to other benefits, for a real-time, on-demand, delivery platform for perishable goods.

As another example, the courier may then park her vehicle in an appropriate location to reach the customer. In some embodiments, the courier may confirm that the vehicle is parked by transmitting the confirmation from the courier device to the server, thereby triggering parked at customer event 230, similar to the parked at merchant event 224. The courier may then have to walk or otherwise travel from the parking location to the customer location. An arrival at customer event (not shown) may also occur when the courier has arrived at the customer location before delivery of the order.

In various embodiments, the tracking of events or milestones may provide guidance to a pairing or routing algorithm to identify the most efficient courier. For example, generating ETA predictions for various events, as described above, may allow for more optimal pairing of couriers for on-demand delivery of perishable goods originating from third party merchants.

Figure 3:
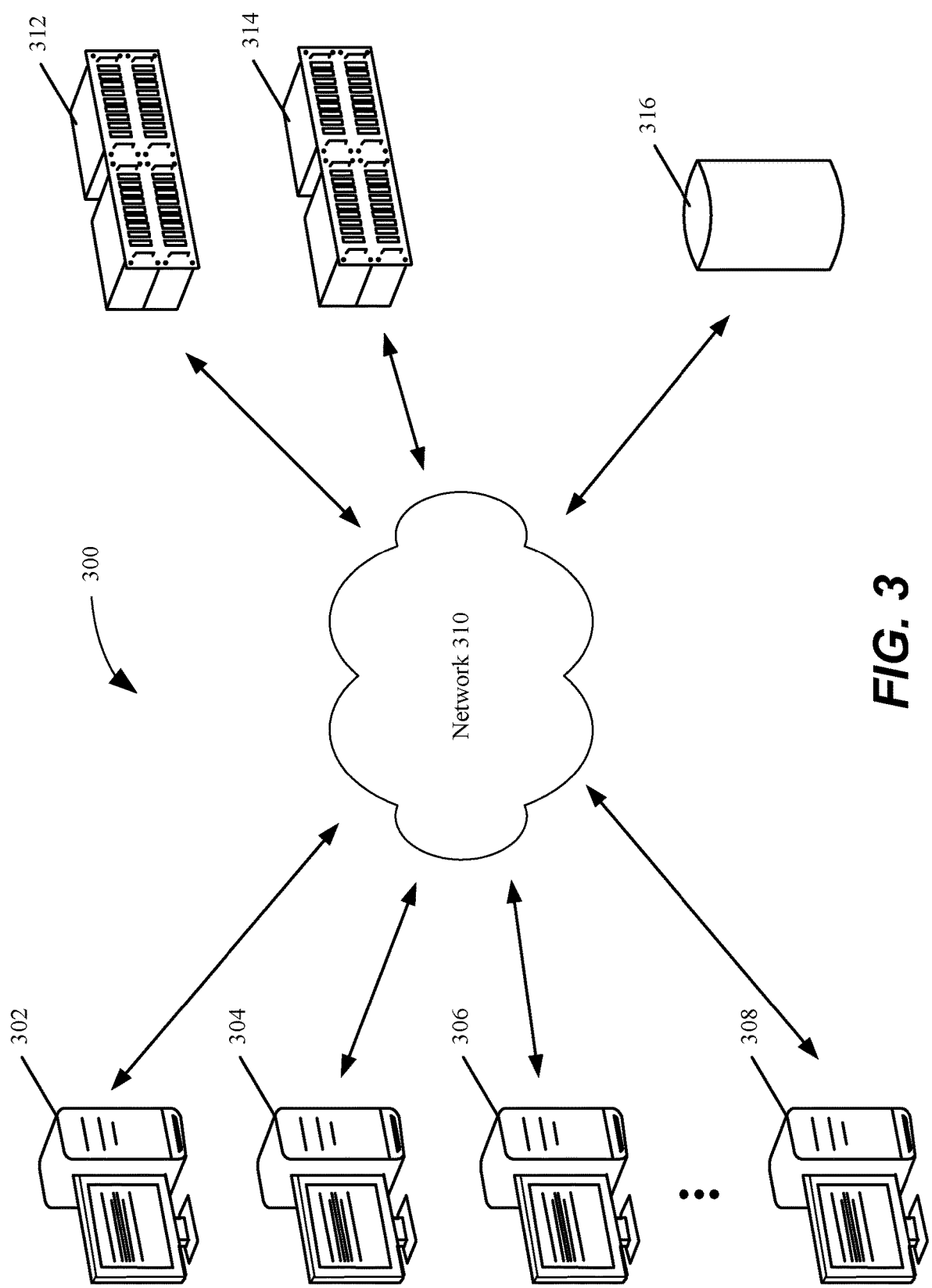
FIG. 3 illustrates a diagram of an example network architecture for implementing various systems and methods of the present disclosure, in accordance with one or more embodiments.

In various embodiments, one or more of the events described herein may be transmitted to client devices corresponding to customers, merchants, or couriers. FIG. 3 illustrates a diagram of an example network architecture 300 for implementing various systems and methods of the present disclosure, in accordance with one or more embodiments. The network architecture 300 includes a number of client devices 302-308 communicably connected to one or more server systems 312 and 314 by a network 310. In some embodiments, server systems 312 and 314 include one or more processors and memory. The processors of server systems 312 and 314 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 312 is a content server configured to receive and store network profile information. In some embodiments server system 314 is a dispatch server configured to transmit and/or route network data packets including network messages. In some embodiments, content server 310 and dispatch server 312 are configured as a single server system that is configured to perform the operations of both servers.

In some embodiments, the network architecture 300 may further include a database 316 communicably connected to client devices 302-308 and server systems 312 and 314 via network 310. In some embodiments, network data, or other information such as user information, courier information, and merchant information, may be stored in and/or retrieved from database 316.

Users of the client devices 302-308 access the server system 312 to participate in a network data exchange service. For example, the client devices 302-308 can execute web browser applications that can be used to access the network data exchange service. In another example, the client devices 302-308 can execute software applications that are specific to the network (e.g., networking data exchange "apps" running on smartphones).

Users interacting with the client devices 302-308 can participate in the network data exchange service provided by the server system 312 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 312. For example, the user may post a review of a restaurant to a restaurant review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calf.").

In some implementations, the client devices 302-308 can be computing devices such as laptop or desktop computers, smartphones, personal digital assistants, portable media players, tablet computers, or other appropriate computing devices that can be used to communicate with an electronic social network. In some implementations, the server system 312 can include one or more computing devices such as a computer server. In various embodiments, each of client devices 302-308 may be any one of merchant devices corresponding to merchants 110-116, courier devices corresponding to couriers 120-128, or customer devices corresponding to customers 130-136.

In some implementations, the server system 312 can represent more than one computing device working together to perform the actions of a server computer (e.g., cloud computing). In some implementations, the network 310 can be a public communication network (e.g., the Internet, cellular data network, dial up modems over a telephone network) or a private communications network (e.g., private LAN, leased lines).

Figure 4A:
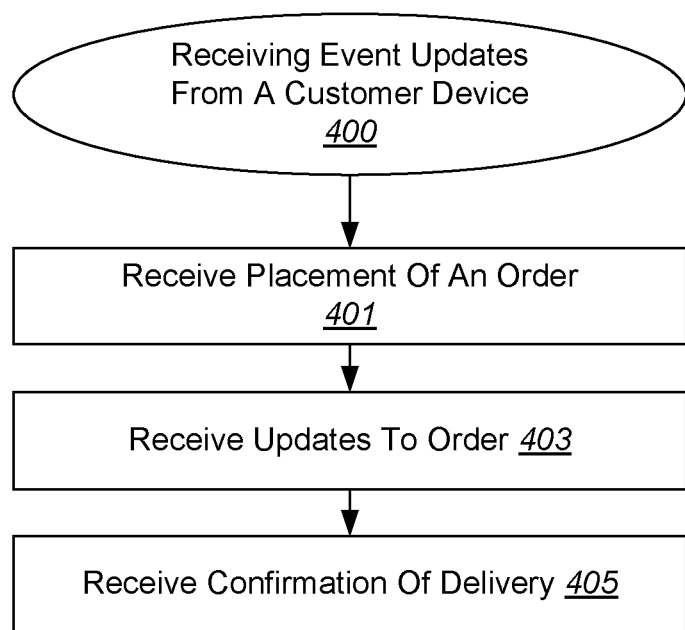
FIGS. 4A, 4B, and 4C illustrate example processes for receiving multiple events and timestamps, in accordance with one or more embodiments.
Figure 4B:
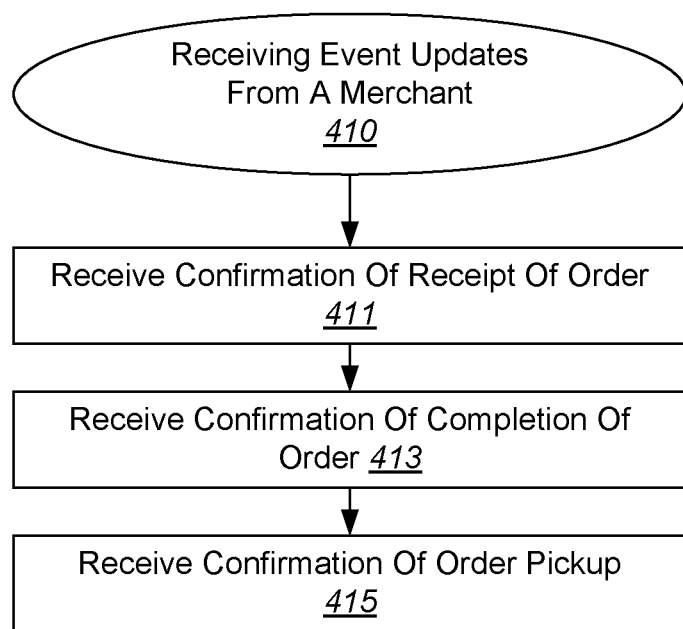
Figure 4C:
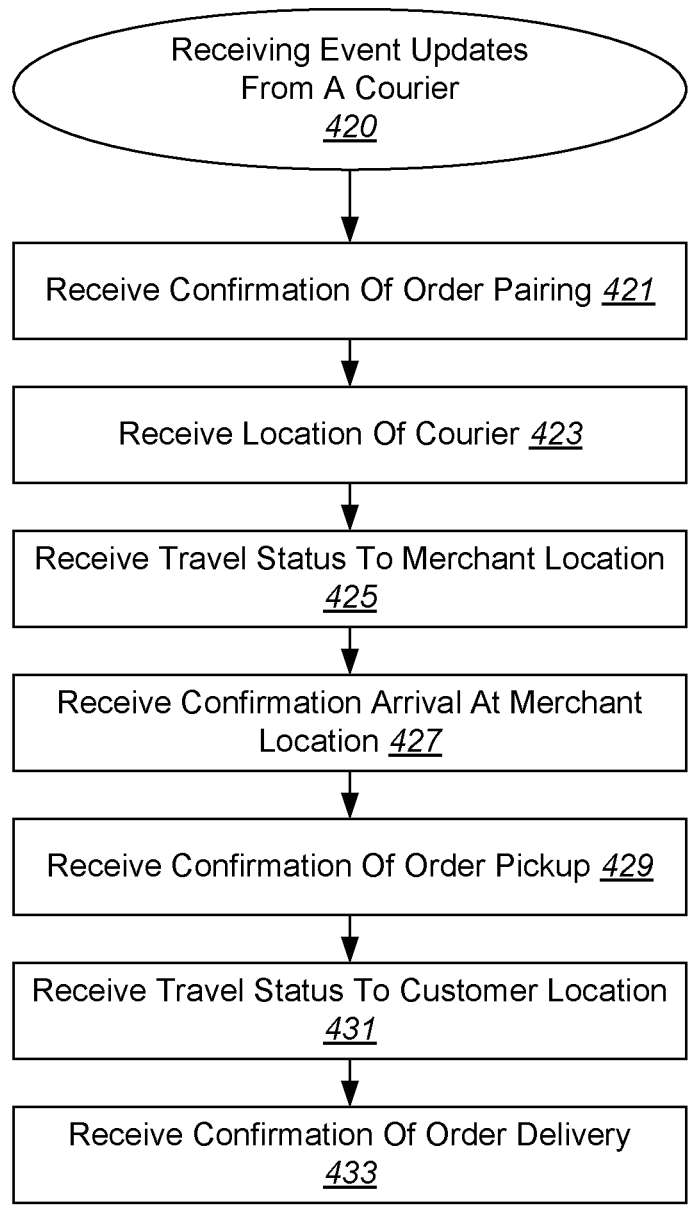

Various customers, merchants, and couriers may transmit information related to one or more orders to the servers 312 or 314 via corresponding client devices. As previously described, such information may include order information, payment information, activity updates, timestamps, location information, or other appropriate electronic information. The system may then utilize this information to calculate the ETA of the delivery of the order, as well as dynamically updating the ETA when updated timestamps are received. With reference to FIGS. 4A-4C, shown are example methods for receiving multiple events and timestamps, in accordance with one or more embodiments.

FIG. 4A depicts an example flow chart of an example process 400 for receiving event updates from a customer device. At 401, a placement of an order is received. In some embodiments, an order may be placed by a customer on a corresponding customer device, such as 302-308. In some embodiments, the order may be placed in a web browser or an application installed in the customer device. The order information may be transmitted via network 310. The order placement may include location information corresponding to the location for delivery of the order. For example, the location of the customer device may be determined via GPS. As another example, the location information may include an address corresponding to the customer. Order placement may further include additional information, such as ordered items, payment information, and other customer information. In some embodiments, the receipt of an order at 401 may correspond to the order creation event 212-A and/or 212-B.

In some embodiments, updates to the order may be received at 403. In some embodiments, order updates may include addition or removal of various items in the order, cancellation of the order, changes in delivery location, etc. In some embodiments, updates to the order may be factored into the predicted ETA of order delivery. In some embodiments, a confirmation of delivery may be received from the customer device at 405. For example, the customer may transmit a confirmation of delivery via the customer device once the order is received from the courier. However, in some embodiments, confirmation of delivery may be transmitted by the courier via a corresponding courier device, as further described with reference to FIG. 4C. In some embodiments, receiving updates to the order may be an optional implementation.

FIG. 4B depicts an example flow chart of an example process 410 for receiving event updates from a merchant device. A confirmation of receipt of order may be received at 411. In some embodiments, an order may be routed over network 310 by the system to the merchant device associated with the appropriate merchant. The merchant may then transmit a confirmation of receipt of the order, which may trigger the order confirmation event 216. In some embodiments, the confirmation of receipt order at 411 may be automatically transmitted via network 310 to the system 312 once the order has been successfully routed to and received by the merchant device.

Once the merchant has completed the preparation of the order, a confirmation of completion of order may be received at 413. The confirmation of completion of order may trigger the order ready event 218. A confirmation of order pickup may then be received at 415 and trigger the order pickup event 220-A. The merchant may transmit the order pickup confirmation via the merchant device once the courier has picked up the order. However, in some embodiments, confirmation of order pickup may be transmitted by the courier via a corresponding courier device, as further described with reference to FIG. 4C.

FIG. 4C depicts an example flow chart of an example process 420 for receiving event updates from a courier device. At 421, a confirmation of order pairing may be received. In some embodiments, the confirmation of order pairing may be an acceptance of the delivery opportunity for the order input by the courier on the courier device. At 423, the location of the courier may be received. In some embodiments, the location of the courier may be tracked and updated in real time. In some embodiments, the location of the courier may be tracked via the courier device, such as by using real-time GPS coordinates. In some embodiments, the location of the courier may be additionally tracked using proximity beacons.

In various embodiments, the courier may travel to the merchant location after order pairing 222. As the courier travels to the merchant location, the travel status to the merchant location may be received at 425. In various embodiments, the travel status may include the status of the vehicle corresponding to the courier. For example, the courier device may transmit a notification to the server system that the courier has parked his vehicle near the merchant location. This may correspond to the parked at merchant event 224.

Upon the courier's arrival at the merchant location, a confirmation of arrival at merchant location may be received at 427. In some embodiments, the confirmation of arrival at merchant location may be a check-in status update input by the courier on the courier device and transmitted via network 310. Once the order is provided to the courier, a confirmation of order pickup may be received at 429. In some embodiments, the confirmation of order pickup may be confirmed by the courier via the courier device. As previously described, the confirmation of order pickup may additionally, and/or alternatively, be confirmed by the merchant via the merchant device.

In various embodiments, the courier may travel to the customer location after order pickup 220-B. As the courier travels to the customer location, the travel status to the customer location may be received at 431. In various embodiments, the travel status may include the status of the vehicle corresponding to the courier. For example, the courier device may transmit a notification to the server system that the courier has returned to the vehicle after the order pickup. This may correspond to the return to vehicle event 228. As another example, the courier device may transmit a notification to the server system that the courier has parked his vehicle near the customer location. This may correspond to the parked at customer event 230.

Next, a confirmation of order delivery may be received at 433 from the courier device. In some embodiments, the confirmation of order delivery may be confirmed by the courier via the courier device. As previously described, the confirmation of order delivery may additionally, and/or alternatively, be confirmed by the customer via the customer device.

In some embodiments, processes 400, 410, and 420 may be integrated within a single process. In some embodiments, the described system may receive additional or fewer event updates than depicted in FIGS. 4A-4C.

In some embodiments, the travel status of the courier at various points in timeline 200 may be tracked via a proximity system, which includes one or more beacons. Various systems and processes for determining the location of a courier using proximity sensors and/or beacons are described in U.S. patent application Ser. No. 15/826,737 titled PREDICTIONS BY USING BEACONS IN A REAL-TIME LAST MILE LOGISTICS PLATFORM by Hsieh et al., filed on Nov. 30, 2017, which application is incorporated by reference herein in its entirety and for all purposes.

For example, BLE beacon sensors may be placed in the courier's vehicle, which may be configured to detect a beacon device corresponding to the courier location. In some embodiments, the beacon device may be a client device associated with the courier. Additionally, beacon sensors may be located at one or more merchant locations. In some embodiments, the courier device may include the beacon sensor and beacon devices may be located at the courier's vehicle or various merchant locations. As the courier, and the corresponding courier device, travels toward and away from various beacons, the location real-time location of the courier may be tracked.

For example, if it is detected that the distance between the courier and the courier's vehicle increases after order pairing 222, but before order pickup 220-B, then it may be determined that the courier has parked the vehicle and is moving toward the merchant location. As another example, the courier may be determined to be walking toward the merchant location via proximity sensors located at one or more nearby merchant locations, as well as the target merchant location, which are configured to detect the beacon device corresponding to the courier's location. Arrival at merchant 226 may also be determined when the courier device is brought within a predetermined radius of a beacon sensor at the merchant location.

The travel status of the courier may also be tracked after order pickup 220-B and before order delivery 232. If it is detected that the distance between the courier and the merchant location increases, then it may be determined that the courier is leaving the merchant location and traveling toward the vehicle. As another example, once the courier moves within a predetermined radius of the vehicle, the proximity sensors may determine that the return to vehicle event 228 has occurred, and an additional travel status to customer location may be received at 431. Subsequently, if it is detected that the distance between the courier and the courier's vehicle increases, then it may be determined that the courier has parked the vehicle and is moving toward the customer location to deliver the order.

Additionally, after order delivery 232 occurs, the proximity system may determine that the courier has returned to the vehicle when the courier has traveled within a predetermined radius of the vehicle. This may indicate that the courier is ready to be paired with another order and given a corresponding delivery opportunity. In various embodiments, other events indicating travel status of the courier to the merchant may be tracked at 425 and 431.

Figure 5:
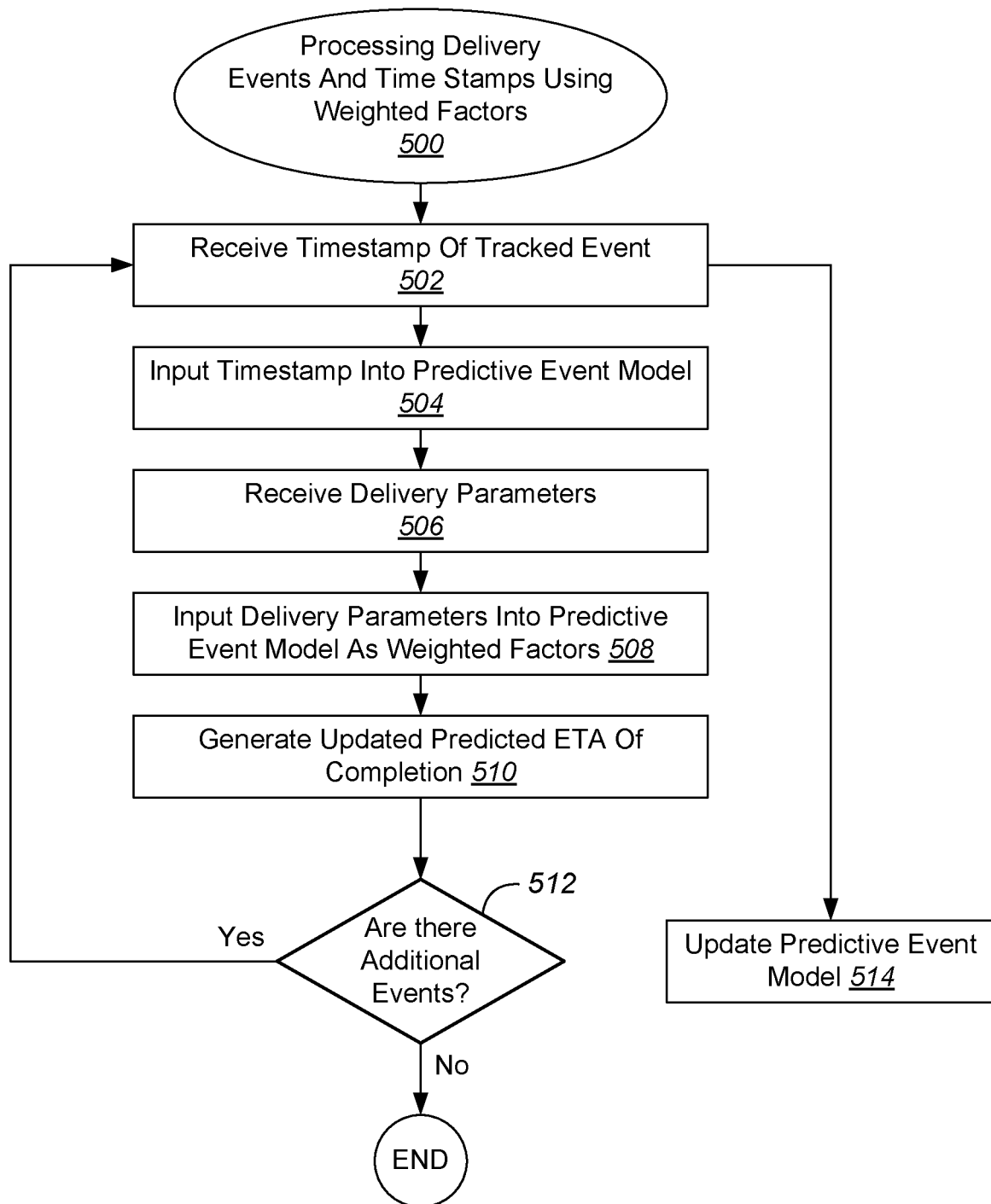
FIG. 5 illustrates a method for dynamic estimated time of arrival predictions, in accordance with one or more embodiments.

FIG. 5 illustrates an example process 500 for processing of delivery events and timestamps using weighted factors, in accordance with one or more embodiments. At 502, a timestamp of an event corresponding to an order is received. In various embodiments, the order may be an order placed by a customer via a customer device. In some embodiments, the event may be any one of events described with reference to FIG. 2, and received as described with reference to FIGS. 4A-4C.

At 504, the timestamp is input into a corresponding predictive event model. In some embodiments, a neural network is implemented to generate an estimated time of arrival (ETA) for a particular order. In some embodiments, a gradient boosted machine is implemented to generate the ETA for a particular order. For example, a gradient boosted machine implemented in various example embodiments may comprise a plurality of iteratively trained chained decision trees. A single decision tree may be trained at a time with each subsequent decision tree trained based on the measured error from the previously trained decision tree.

In various embodiments, the ETA for a particular order comprises an estimated timestamp corresponding to the delivery event 232 for the order. Such systems may learn (or progressively improve performance) to do tasks by considering examples, generally without task-specific programming, such as generate accurate ETA predictions. In some embodiments, the predictive event model inputs a timestamp associated with an event and generate predictive ETAs for one or more subsequent delivery events.

In some embodiments, the ETA for a particular order may correspond to a time duration, or Predicted Delivery Duration ("PDD") for the order. For example, the predicted delivery duration may be determined from a predicted ETA timestamp for an ordered paired event 222 and a predicted ETA timestamp for the order delivery event 232, both of which may be based off of a received ATA timestamp for an order created even 212-B. As another example, a predicted delivery duration may be determined from an ATA timestamp received for order created event 212-B and the corresponding predicted ETA timestamp for the order delivery event 232. In various embodiments, the PDD may be determined based on the predicted timestamps for any one of the various events described with reference to FIG. 2.

In some embodiments, a predictive event model implementing a neural network may comprise a plurality of subnetworks, each of which function as a predictive event model to generate an estimated length of time for a particular interval of time between subsequent delivery events. As used herein, the terms "subnetwork" and "event model" may be used interchangeably, unless otherwise noted. In some embodiments, each interval between events, such as those events illustrated in FIG. 2, may be associated with a subnetwork. In other words, a particular predictive event model may predict a duration between one event to the next, as shown in FIG. 2.

At 506, delivery parameters corresponding to the order are received. Delivery parameters may include various factors or measurements that may affect the length of time between one or more tracked events. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the predictive event model.

At 508, the delivery parameters are input into the corresponding predictive event model as weighted factors. In various embodiments, the predictive event model may be trained to correlate the various parameters with particular effects on time durations between successive events. The predictive event model may assign weights to such parameters creating weighted factors. Such weights may be adjusted based on actual time of arrivals.

For example, certain dates may fall on holidays that are historically known to be busy days. Thus, certain holidays may be correlated with increased traffic or increased number of orders placed. Additionally, certain times of the day may be associated with heavier traffic, such as during rush hours. In some embodiments, the time of day is a parameter that is continuously updated in real-time and input into the predictive event model.

In some embodiments, traffic information may be tracked in real-time. In some embodiments, traffic information may be tracked by a third party application. In some embodiments, traffic data is updated in real-time, or constantly updated in near real-time.

Parameters corresponding to weather may also inform traffic or order impact. For example, inclement weather may correlate with heavier traffic due to hazardous conditions. Inclement weather may also correlate with more orders placed since customers may be more likely to stay indoors. Weather parameters may also correspond to change in demands for particular food types. For example, more ice cream may be ordered during hot days.

In some embodiments, the size of markets may correspond to the number of individuals in a certain market who are potential customers, couriers, and/or merchants of a product or service. As used herein, the term market may be used to mean either a particular merchant, or a group of merchants associated with a particular product type. However, in some embodiments, the term market may refer to the total customers, couriers, and/or merchants in a given area that is part of the on-demand delivery platform. The predictive event model may identify particular market sizes as correlated with certain differences in times for order preparation or delivery. The size of markets may also correspond to new and more mature markets. For example, a newer market may be correlated with longer order preparation times, while more mature markets may be correlated with faster order preparation times.

Another input parameter may include fleet load factor, which corresponds to the ratio of number of orders outstanding to the number of couriers outstanding. In some embodiments, the higher this ratio of fleet load factors may correspond to an insufficient amount of couriers, and thus longer time durations for events after order ready 218.

In some embodiments, the item types in an order may be input as parameters. For example, certain dishes may be correlated with particular preparation times. In some embodiments, the size of an order may be input as predictive parameters. In some embodiments, more items within an order may correlate to longer preparation times. In some embodiments, the sub-total price of an order may also correspond to order size or order preparation time. For example, a larger sub-total may correlate to a larger amount of items within the order. Additionally, more expensive items may take longer to make, due to more ingredients, more difficulty, or more specialization in preparation.

In some embodiments, the predictive event model may determine the average rate for time durations between one or more events on a courier timeline 210 for couriers in a given predetermined area. Similarly, in some embodiments, the predictive event model may determine the average rate for time durations between one or more events on a merchant timeline 210 for a particular merchant. However, historical performance may also be input as parameters.

The historical performance of a courier may be a record of the previous time durations between one or more events on courier timeline 211 for a particular courier. This record may be compared to the average time durations between one or more events on courier timeline 211 for all couriers within a given area. The predictive event model may use this factor to assign a particular state variable to a given courier to adjust predictions accordingly. For example, a given courier may have shorter time durations between particular events, such as between parked at merchant 224 and arrival at merchant 226, as compared to the average for a given area. The predictive event model may adjust the ETA prediction for arrival at merchant 226 accordingly for this particular courier.

The historical performance of a particular merchant may also be input. This may include the average time duration between events on merchant timeline 210 for that particular merchant. The predictive event model may use this factor to assign a particular state variable to a given merchant to adjust predictions accordingly. For example, the average time for a particular merchant to prepare a particular item may be tracked and determined. As an example, some merchants may not transmit a confirmation of receipt of order, such as at step 411, but instead immediately begin preparation of the order. Once the order has been complete, the merchant may then transmit the confirmation of receipt of order and confirmation of completion of order simultaneously. The predictive event model may determine an ETA prediction accordingly such that a delivery routing system may appropriately pair a courier at the optimal or more advantageous time.

In some embodiments, historical performance parameters may be organized into aggregate units for a predetermined amount of time. For example, the historical performance of a courier or merchant for the previous thirty (30) day increment is given higher weighted values. In some embodiments, the historical performance parameters for days occurring before the previous thirty (30) days are also input with lower weighted values. In some embodiments, the historical performance parameters for days occurring before the previous thirty (30) days may be discarded.

In various embodiments, weights assigned to particular parameters may be updated based on other parameters. For example, the weight given to traffic may be adjusted in real-time as the time changes from peak rush hour to after rush hour. In some embodiments, one or more parameters may cause the predictive event model to maintain a particular state variable.

At 510, an updated predicted estimated time of arrival (ETA) is generated. The parameters and timestamp are input into various computational layers of the subnetwork. In some embodiments, such computational layers may include, but are not limited to, linear layers, convolution layers, deconvolution layers, residual layers, quadratic layers, etc. In some embodiments, the timestamp of an event, or actual time of arrival (ATA) for the event, is input into one or more computational layers of a predictive model to output a predicted ETA for the delivery of the order, such as order delivery 232.

In other embodiments, the ATA of an event is input into one or more computational layers to output a predicted ETA for a subsequent delivery event. Then, the output predicted ETA is input into additional computational layers of another predictive model to determine additional predicted ETAs for additional delivery events. In some embodiments, each computational layer in a subnetwork may correspond to one or more parameters.

In some embodiments, a predicted ETA may be generated for each event on timelines 210 and 211. In some embodiments, the predicted ETAs for one or more events may be transmitted to various client devices, such as customer devices, merchant devices, and courier devices. The predicted ETAs may further be used for delivery routing system for pairing of orders to couriers and merchants for delivery.

This approach divides the delivery process into distinct delivery events that are more predictable because they depend on unique features of the merchant, such as order protocol, food preparation speed, etc. Furthermore, the disclosed system provides increased capability of receiving the timestamp data for each delivery event through various applications and devices. Thus, there is a natural way to incorporate real-time updates to ETA predictions based on events that take place during a delivery.

At 512, it is determined whether additional events exist for the delivery. If an ATA for the final event, such as order delivery 232, has been received, then process 500 ends. However, if additional events exist, then process 500 returns to operation 502 to receive the timestamp of a subsequent event. The timestamp of the subsequent event may be used by the predictive event model to train itself by comparing the timestamp of the subsequent event with the predicted ETA at 514.

At 514, a corresponding event model is updated. In some embodiments, the processor dynamically generates the plurality of ETA time durations by continuously training a predictive event model using the plurality of weighted factors. In various embodiments, the weights may also be adjusted based on timestamps corresponding to ATAs of various delivery event updates that are received as described in FIGS. 4A-4C. When an event update is received, the predictive event model may compare the ATA with the predicted ETA for a particular event and analyze and differences. Based on the comparison, the predictive event model may update weights given to particular parameters to account for any differences between the predicted ETA and the received ATA for an event. As such, the predictive event model of the dynamic ETA prediction system is continuously being trained during operation.

Figure 6:
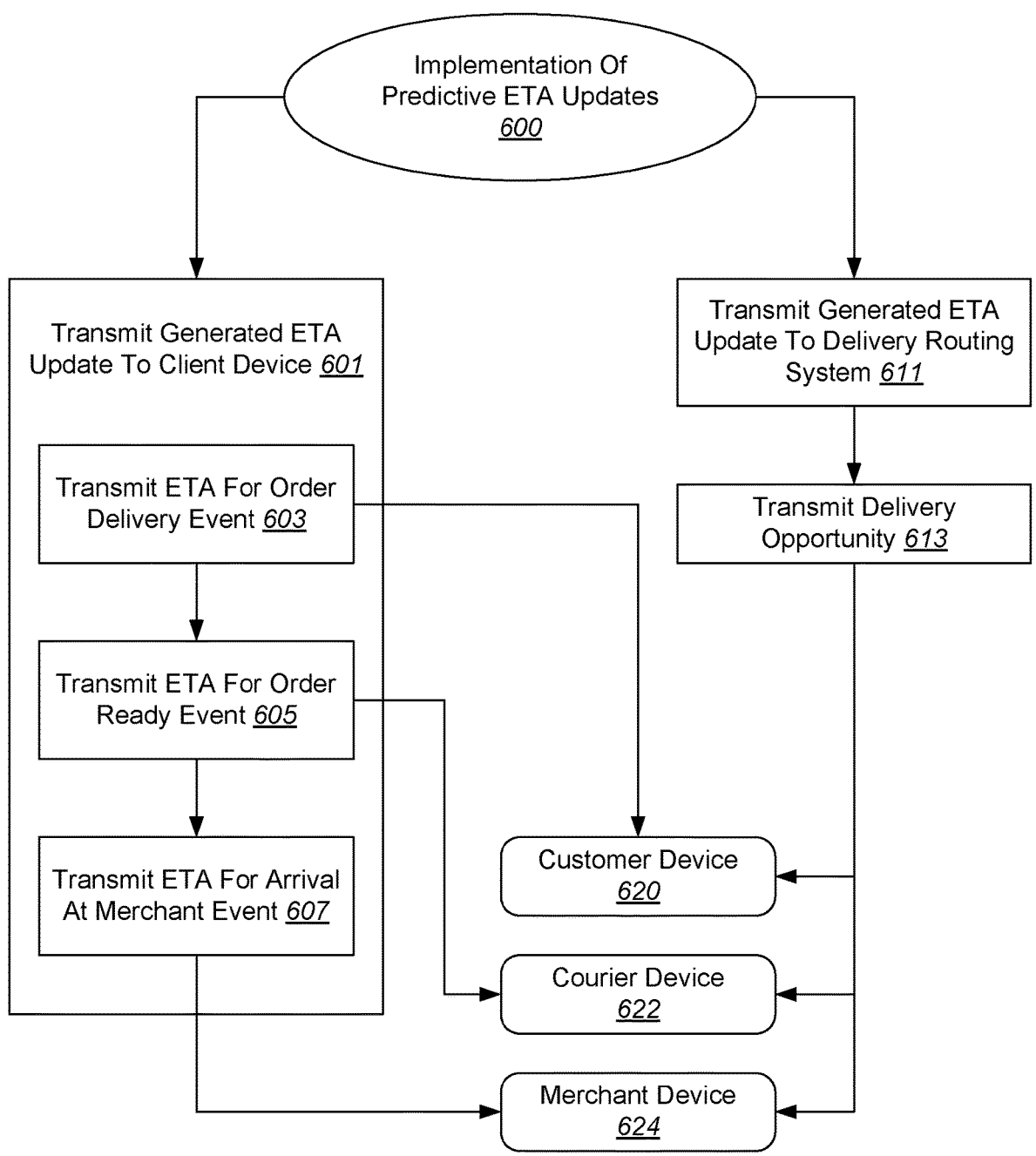
FIG. 6 illustrates an example flow process for implementation of predictive ETA updates, in accordance with one or more embodiments.

FIG. 6 illustrates an example flow process 600 for implementation of predictive ETA updates, in accordance with one or more embodiments. As previously described, the described systems may generate predictive ETA updates for one or more delivery events, including completion of the order by the restaurant, pickup of the order by the courier, and completion of delivery of perishable goods to the customer. Such predictive ETA updates may be transmitted to various client devices at 601. As shown in FIG. 6, such client devices include customer device 620, courier device 622, and merchant device 624. Client devices 620, 622, and 624 may be any one of client devices 302-308, as shown in FIG. 3.

For example, at step 603, a predicted ETA for order delivery 232 may be provided to the customer device 620. As another example, at step 605, the predicted ETA for order ready 218 may be provided to the courier device 624 to notify the courier that it is ready for pickup. As a further example, at 607, the predicted ETA for arrival at merchant 226 may be provided to the merchant device 624 to notify the merchant when to expect a courier to arrive. One or more predicted ETA updates for various other events may be transmitted to any one of client devices 620, 622, and 624.

The disclosed systems may also provide a delivery routing system with timestamps necessary to make informed decisions on when deliveries should be paired with a courier. In some embodiments, the predicted ETA updates are transmitted to a delivery routing system at step 611. Such delivery routing system may determine a predicted delivery duration from the various predicted ETA timestamps for an order which may be used to generate delivery service value for the order. Such delivery service value may be then be transmitted to a courier device 622 with a corresponding delivery opportunity, as further described with reference to step 613.

Such delivery routing system may further input the ETA updates into a pairing algorithm to pair couriers with a plurality of received orders. In some embodiments, the delivery routing system may pair subsequent orders to a courier based on the predicted ETAs for various events. For example, a subsequent order may be paired with a courier that is currently en route to a customer location based on the predicted ETA for the order delivery 232. In some embodiments, the pairing of a subsequent order may also depend on the predicted ETA of the order ready event 218 of the subsequent order, as well as distance and travel time parameters of the courier to the merchant corresponding to the subsequent order.

In various embodiments, at step 613, the delivery opportunity may be transmitted to a customer device 620 to notify the customer of information corresponding to the courier, such as identification, contact information, etc. In some embodiments, the delivery opportunity may be transmitted to the courier device 622 to notify the courier of information corresponding to the merchant and/or customer, such as location, contact information, order information, etc. As previously described, the delivery opportunity may be transmitted at step 613 with a corresponding delivery service value. In some embodiments, the delivery opportunity for an order pairing may be transmitted to the merchant device 624 to notify the merchant of information corresponding to the customer and/or courier, including contact information.

In some embodiments, the delivery routing system may pair multiple orders with the same courier. For example, multiple orders being delivered to customer locations that are within a predetermined distance may be paired with the same courier to optimize a travel route for delivery. In some embodiments, the predicted ETAs for order ready events 218 of such multiple orders may be input to determine whether a single courier should be transmitted multiple delivery opportunities for multiple orders.

Additionally, it provides a method for pinpointing issues to determine which part of a delivery went wrong by comparing predicted and actual event timestamps. In some embodiments, the plurality of ETA time durations may be used to escalate issues and determine which part of a delivery went wrong by comparing predicted and actual event timestamps. For example, any large discrepancies between predicted ETAs and ATAs for events in a delivery may be identified to pinpoint where delays occurred amongst the delivery events, as well as identify major causes for delays. For example, for a particular delivery, the greatest discrepancy between predicted ETA and ATA may be identified for the parked at merchant event 224. If multiple instances of such discrepancy occur for multiple couriers, the cause may be identified as a lack of parking areas near such merchant. Once identified, this issue may be appropriately addressed to further optimize deliveries.

In various embodiments, a delivery routing system may pair a delivery opportunity with one or more couriers. The delivery opportunity may be transmitted to a courier device corresponding to the courier with an option for the courier to accept or reject the delivery opportunity. The delivery opportunity may be transmitted in real-time or near real-time to the courier once the order has been placed by the customer.

In the described examples, the delivery opportunity includes a service value. The delivery service value may correspond to an amount of compensation offered to a courier for completing the delivery. For example, the delivery opportunity may include a monetary amount the courier will be compensated for completing the delivery. The value amount provided to the courier at the courier device may be referred to herein as "Fair Value Offer Amount" ("FVOA").

In some embodiments, the provided systems and methods apply to orders that have been scheduled in advance. In some embodiments, the service value of such pre-scheduled orders may be provided to the couriers in real-time along with the corresponding delivery opportunity.

In various embodiments, the delivery service value may correspond in part to the predicted effort required to complete the delivery. In at least one example, such effort may be based on the predicted time duration between courier acceptance of a delivery opportunity for an order (event 222) and delivery of the order to the customer (event 232), which may be referred to herein as "Predicted Delivery Duration" ("PDD"). In some embodiments, the PDD is determined for a delivery opportunity moments before the delivery opportunity is paired and transmitted to a courier. In some embodiments, the Predicted Delivery Duration may be determined by the various mechanisms and methods described herein, and may be determined in seconds. As such, the Predicted Delivery Duration takes into account weighted factors or variables, such as road distance, traffic conditions, food preparation time, order placement protocol, number of items, parking conditions at the merchant, destination type, etc.

In various embodiments, the delivery service value of a given delivery opportunity is determined by multiplying the PDD by a predetermined active time value. The predetermined active time value may correspond to value amount for an amount of active delivery time spent by the courier on a delivery for an order. For example, the active delivery time may correspond to the amount of time between the order paired event 222 and delivery event 232. In some embodiments, the predetermined active time value may vary based on various factors, including location, time of day, traffic conditions, etc. This may provide a mechanism to easily evaluate and determine what constitutes fair and competitive compensation for a delivery and how it varies by geography and time of day.

In various embodiments, the location may correspond to the location of the courier. In other embodiments, the location may correspond to the merchant preparing the order for delivery, or the delivery destination of the customer. In some embodiments, the location of a merchant, customer, or courier corresponds to a defined geographic area in which such merchant, customer, or courier is located. In some embodiments, the active time value may be adjusted in various increments, such as in 30-minute increments. For example, for a given area corresponding to the location of the merchant, an active time value of $15.00 may be set for between the hours of 11:30 am and 1:00 pm.

In some embodiments, the active time value is determined and configured by local operators. For example, the active time value may be adjusted to account for bias that may occur in the predictive event model. Bias may occur due to over-predicting or under-predicting delivery durations, on average. Thus, the active hourly pay target (AHPT) may be adjusted by an offsetting amount. For example, deliveries in a given market may include a PDD that is on average 1 minute longer than actual delivery durations. If the target AHPT is set at $20.00 per active hour, then the active time value may be lowered in order to offset this 1-minute prediction model bias.

Figure 7:
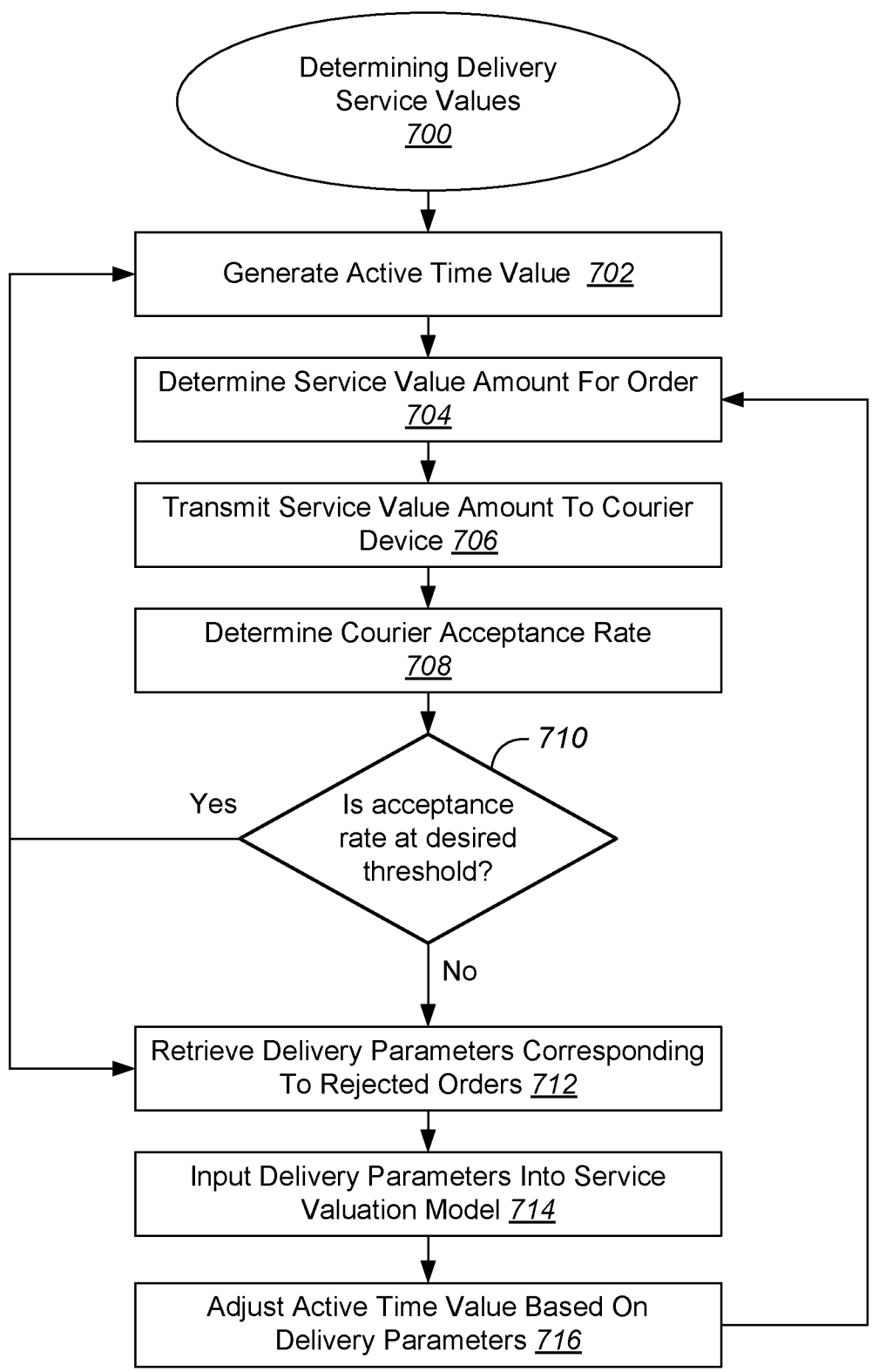
FIG. 7 illustrates a method for determining delivery service values, in accordance with one or more embodiments.

In other example embodiments, the active time value is automatically determined and dynamically adjusted based various other weighted factors. FIG. 7 illustrates an example process 700 for determining delivery service values, in accordance with one or more embodiments. At 702, an active time value is generated. In some embodiments, such active time value is an initial active time value predetermined by local operators or a previous active time value corresponding to a previous time increment. In some embodiments, the active time value is generated using a service valuation model, further described below.

At 704, a service value for an order is determined using the active time value generated at step 702. The service value amount for the order may be determined by multiplying the active time value with a predicted delivery duration for the delivery of the order. In some embodiments, the predicted duration of delivery may be generated using a predictive model as previously described with reference to process 500.

At 706, the service value amount is transmitted to a courier device associated with a courier. The delivery routing system may generate a delivery pairing between an order and a courier. Various mechanisms and processes for pairing delivery offers for perishable goods with couriers are described in U.S. patent application Ser. No. 15/826,736 titled SYSTEM AND METHOD FOR DYNAMIC PAIRING FUNCTION OPTIMIZATION by Chopra et al., filed on Nov. 30, 2017, which application is incorporated by reference herein in its entirety and for all purposes.

The service value amount may be transmitted along with a corresponding delivery pairing for the order as a Fair Value Offer Amount for completing the delivery. In some embodiments, the delivery pairing includes an option for the courier to accept or reject the delivery opportunity via the courier device. One or more other delivery opportunities may be paired with other couriers and transmitted to courier devices associated with the other couriers.

In some embodiments, the service value amount may be adjusted before being transmitted as the Fair Value Offer Amount to the courier device. In some examples, the service value amount may be adjusted based on predetermined floor and ceiling values. For example, a base value may be set to $5.00 and a maximum value may be set to $40.00. The predetermined floor and ceiling values may prevent overvaluation or undervaluation of edge cases that either have very short or very long PDDs. In other embodiments, the predetermined floor value may correspond to a base distance rate. For example, a base distance rate may be set at $1.00 per mile. Therefore a delivery that requires a travel distance of 7 miles would have a floor service value of $7.00. Thus, if such delivery included a calculated service value amount of $5.00 calculated at step 704, it would be adjusted to $7.00 before transmittal to the courier device. Such adjustments and other adjustments may be made by determining a supplemental value amount to adjust a determined service value, as further described below.

In particular embodiments, a courier acceptance rate may be determined at operation 708. The courier acceptance rate may be determined based on various different values and calculations. In some embodiments, the courier acceptance rate corresponds to the average number of times a delivery opportunity is rejected by a courier. In some embodiments, the courier acceptance rate corresponds to the average number of rejections for delivery pairings at a given time. In some embodiments, the courier acceptance rate corresponds to a number of total rejections by all couriers within a given time interval. Various other metrics may be used to determine the efficiency of the delivery routing system in other embodiments. For example, a metric may be the average amount of time required for an order to be accepted and successfully paired after it is created, such as the time interval between order creation 212-B and order pairing 222, for a given number of delivery pairings. Other metrics may be used to quantify the courier acceptance rate at operation 708.

At 710, it is determined whether the acceptance rate is at a desired threshold rate. The desired threshold rate may be predetermined. For example, a desired threshold rate may be set at 0.25 average rejections of delivery opportunities that are transmitted to courier devices within a given time interval. As another example, a desired threshold rate may be set at an average of 45 seconds between order created 212-B and order pairing 222 for transmitted delivery opportunities.

In some embodiments, the desired threshold rate is set to be above a minimum threshold rate, as determined above. In some embodiments, the desired threshold rate is set to be within a range of courier acceptance rates. For example, a desired threshold rate may be set to be any rate between 0.1 to 0.2 average rejections of transmitted delivery opportunities within a given time interval. In some embodiments, if the current courier acceptance rate is at or above a desired threshold rate, then process 700 returns to operation 702 and continues to use the initial or previous active time value in determining delivery service values.

In some embodiments, if the current courier acceptance rate is below a desired threshold rate, it may indicate undervaluation of delivery service values. On the other hand, if the current courier acceptance rate is above a desired threshold rate, it may indicate overvaluation of delivery service values. If the current courier acceptance rate is not at a desired threshold rate, process 700 continues to operation 712, at which point information corresponding to rejected orders is retrieved. In some embodiments, process 700 may optionally also continue to operation 712 if the current courier acceptance rate is at a desired threshold rate.

Information corresponding to rejected orders may include various delivery parameters such as factors or measurements that may affect courier acceptance rates. In some embodiments, the information is associated with particular orders that have received one or more rejections. For example, delivery parameters may include order attributes, such as the size of the order, number of items, special or fragile items that require additional care, or rush items. Delivery parameters may also include total distance of travel. For example, couriers may be more reluctant to accept deliveries that require travel over a particular amount of distance may be very tiring or time consuming. Delivery parameters may also include customer attributes corresponding to the delivery location of the order, such as residence type, elevators, stairs, etc. For example, couriers may be more reluctant to accept deliveries if the delivery destination does not include an elevator. Delivery parameters may also include courier attributes, such as vehicle type. Delivery parameters may also include merchant attributes corresponding to the order, such as parking availability, and courier attributes, such as vehicle type or historical performance.

Such information may be retrieved from a database storing merchant, courier, and customer data. In some embodiments, such information may additionally, and/or alternatively, be received from corresponding client devices. At least some delivery parameters may further include those previously described, such as with reference to method 500, such as time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the service valuation model.

At operation 714, the delivery parameters are input into a service valuation model. In some embodiments, the service valuation model includes a predictive model that is implemented to generate an updated active time value. In some embodiments, the service valuation model implements a gradient boosted machine or gradient boosted decision tree. In other embodiments, the service valuation model implements a neural network with various computational layers. Such systems may learn (or progressively improve performance) to do tasks by considering examples, generally without task-specific programming, such as generating active time values that would predictively increase or decrease courier acceptance rate to the desired acceptance rate. In some embodiments, the service valuation model inputs delivery parameters associated with delivery offers that have received one or more rejections and modify the active time value to apply to subsequent delivery offers.

In some embodiments, a service valuation model implementing a neural network may comprise a plurality of various computational layers, which function to generate a predicted active time value that more closely corresponds to the effort required to complete the delivery. In some embodiments, such computational layers may include, but are not limited to, linear layers, convolution layers, deconvolution layers, residual layers, quadratic layers, etc.

At 714, the delivery parameters for an order are input into the corresponding service valuation model as weighted factors. In various embodiments, the service valuation model may be trained to correlate the various parameters with particular effort required for completing delivery of the order, which in turn would affect courier acceptance of the delivery offering. The service valuation model may assign weights to such parameters creating weighted factors. Such weights may be adjusted based on changes in courier acceptance rates.

For example, certain delivery parameters may cause a courier to consider the delivery service value to be too low to accept the delivery opportunity. For example, dates may fall on holidays that are historically known to be busy days. Furthermore, couriers may be less likely to want to work on holidays. Thus, certain holidays may be correlated with increased effort in making the delivery. Additionally, certain times of the day may be associated with heavier traffic, such as during rush hours. Such traffic conditions may also be correlated with an increased effort in making deliveries. In some embodiments, traffic information may also be a delivery parameter. As another example, inclement weather may also be correlated with increased delivery effort because it may cause difficult driving conditions.

At operation 716, the active time value is adjusted by the service valuation model based on the delivery parameters to cause the courier acceptance rate to be at a desired threshold rate, as described above. In some embodiments, the active time value may be adjusted in real time. However, in other embodiments, the active time value may be adjusted at regular time intervals. For example, the delivery pairing system may determine courier acceptance rate every 30 minutes to compare it to the desired threshold rate to determine whether an adjustment to the active time value is required. In some embodiments, an updated active time value may be generated for each particular location or geographic area. The adjusted active time value may then be used to determine delivery service values for subsequent orders at operation 704.

In other embodiments, an updated active time value may be generated for each particular order. For example, the delivery parameters for a rejected order may be received by the service valuation model to adjust the active time value and determine an updated delivery service value, at 704, for that order before it is transmitted as a delivery offering to a subsequent courier.

In some embodiments, a supplemental value may be determined for the order to adjust the delivery service value before it is transmitted to the courier device. The supplemental delivery value may correspond to an additional value to be added to the delivery service value amount to take into account additional effort required for the delivery. Thus, the Fair Value Offer Amount provided to a courier may correspond to a delivery service value that has been adjusted by a supplemental value.

For example, the supplemental value may be used to ensure that the delivery service value complies with floor and ceiling value requirements. For example, a supplemental value of $0.50 may be added to a determined service value of $4.50 such that the adjusted service value is at a predetermined floor value of $5.00.

A supplemental value may also be determined based on various predetermined factors. In some embodiments, a supplemental value may be determined based on the number of items in an order. A large order with many items may require a courier to make several trips between the courier's vehicle and the merchant. Thus, an additional supplemental value may be added based on the estimated amount of such trips required. For example, the supplemental value may be an additional $0.50 per trip.

As another example, heavy items may correspond to additional effort by the courier to transport such items. Thus, an additional supplemental value may be added based on additional weight above a predetermined threshold weight, such as $0.25 per additional pound above the first 10 pounds.

As another example, increased delivery distances may require additional effort by the courier or fuel expense. Therefore, an additional supplemental value may be added based on additional travel distance above a predetermined threshold distance, such as $0.75 per additional mile beyond 5 miles.

As another example, a supplemental value may be added to adjust the delivery service value based on customer status. In some embodiments, higher courier acceptance rates may be desired for some customers, such as new customers or customers who have experienced past service failures. In some embodiments, higher courier acceptance rates may be desired for placed orders that are behind schedule. Thus, a supplemental value may be determined to increase the Fair Value Offer Amount and thereby increase the chance of acceptance of the particular delivery opportunity by a courier.

In some embodiments, the service valuation model is trained to use the delivery parameters as weighted factors to generate a supplemental delivery value. For example, delivery parameters may be used to estimate the total weight of an order, or the number of trips required to transport the order items from the merchant location to the courier vehicle. In some embodiments, the supplemental delivery value is generated in addition to adjustments to the active time value. However, in other embodiments, the supplemental delivery value is generated in place of adjustments to the active time value.

In some embodiments, the service valuation model is updated by continuous training using the plurality of delivery parameters as weighted factors. In various embodiments, the weights may also be adjusted based on new data regarding system metrics, such as courier acceptance rate. When updates are received, the service valuation model may compare the delivery parameters of rejected delivery opportunities with those of accepted delivery opportunities and analyze the differences. Based on the comparison, the service valuation model may update weights and errors given to particular parameters. As such, the predictive service valuation model of the dynamic delivery value prediction system is continuously being trained during operation.

This approach more closely links the delivery value with the effort required to complete the delivery. This results in compensation that is more fairly aligned with the work associated with each delivery. By linking delivery value with effort, couriers may also experience less volatility in their compensation from day to day.

This aligns the incentives of the couriers with the merchants and customers by preventing couriers from selectively choosing large orders over smaller orders. Thus, smaller orders and orders with inaccessible merchant locations will experience improved service quality.

This approach would also increase courier acceptance rates, which results in improved overall efficiency, and less down time between orders. It also provides a dynamic means of adjusting courier acceptance rates by automatically determining an improved active time value. Increasing courier acceptance rates, or the likelihood of courier acceptance, of first time delivery opportunities also ensures that more deliveries completed by more optimally available couriers.

This approach is also more flexible and dynamic because it is not tied to a fixed amount of compensation per delivery. For example it enables increasing the delivery value every time a delivery opportunity is declined, in order to discover the market-clearing compensation more quickly. Various different experiments may be implemented based different system metrics which were previously impossible. As such, a more efficient market is enabled because variations in fair compensation may be more easily determined in a given market location during regular time intervals.

Figure 8:
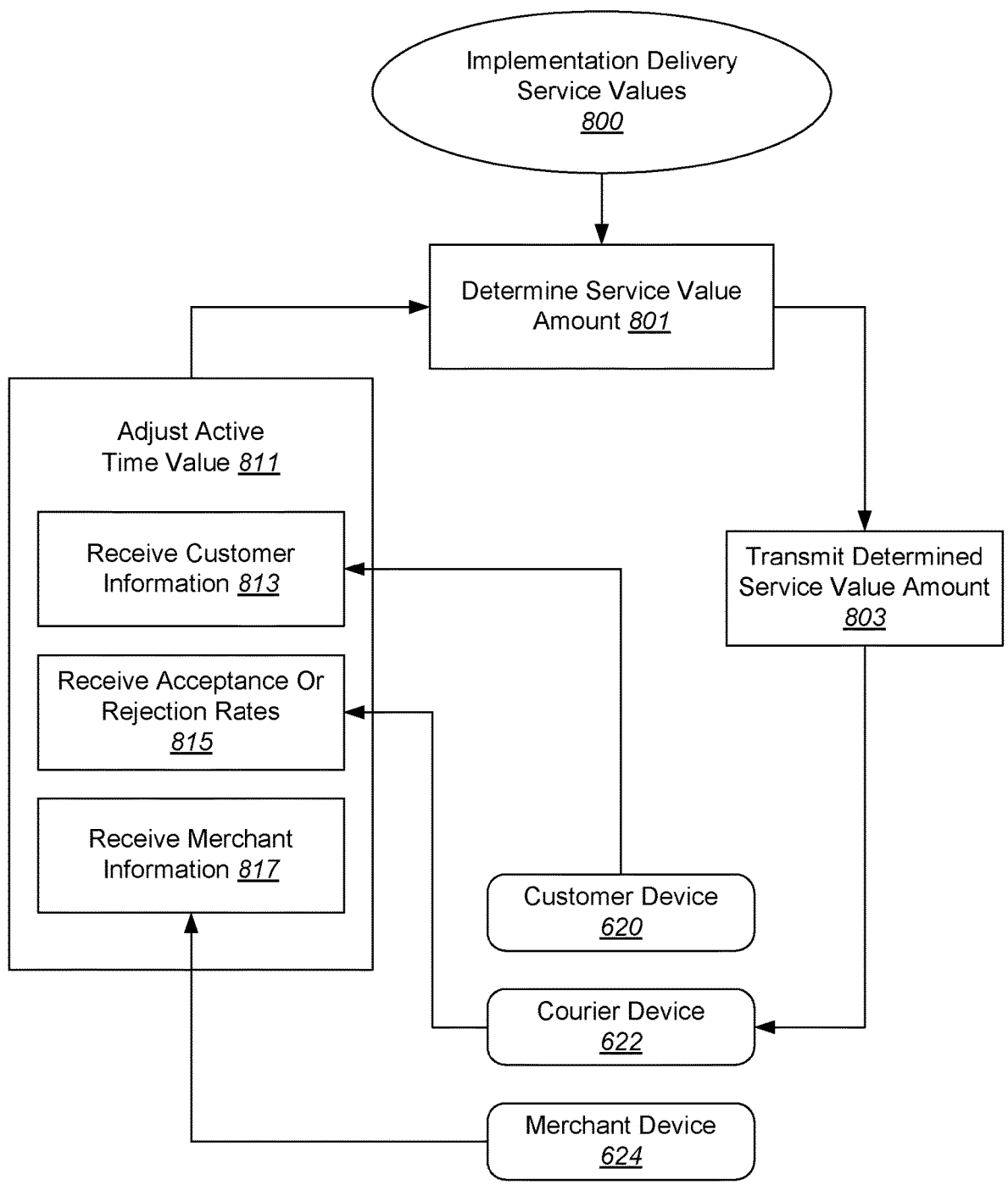
FIG. 8 illustrates an example flow process for implementation of delivery service values, in accordance with one or more embodiments.

FIG. 8 illustrates an example flow process 800 for implementation of delivery service values, in accordance with one or more embodiments. As previously described, the described systems, such as a delivery routing system, may determine a service value amount for each delivery opportunity transmitted to a courier device at 801. At 803, such service value amount may then be transmitted along with the corresponding delivery opportunity to a courier device, such as courier device 622, as shown in FIG. 8. As shown in FIG. 8, other client devices include customer device 620 and merchant device 624. Client devices 620, 622, and 624 may be any one of client devices 302-308, as shown in FIGS. 3 and 6.

As previously described, the disclosed systems may also include a service valuation model to automatically determine the service value amount for delivery opportunities by dynamically adjusting the active time value based on delivery parameters at 811. The active time value may be adjusted to cause the delivery routing system to meet a predetermined courier acceptance rate. Such delivery parameters may be retrieved from storage. However, in some embodiments, the delivery parameters are retrieved from one or more client devices.

For example, the delivery routing system may receive customer information at 813 from customer device 620. Customer information may include delivery parameters such as customer location, residence type, elevators, stairs, etc. The delivery routing system may also receive courier information at 815 from courier device 622. Courier information may include delivery parameters such as historical courier performance, vehicle type, etc. The delivery routing system may also receive merchant information at 817 from merchant device 624. Merchant information may include delivery parameters, such as parking availability, ordered items, foot traffic, etc. As previously described, the delivery parameters used in the service valuation model may include at least some of the delivery parameters used to generate predictive ETA updates, such as described with reference to FIG. 5.

The service valuation model may input the delivery parameters are input into the corresponding predictive event model as weighted factors, as previously described. As also previously described, the service valuation model may be a gradient boosted machine based off of iteratively trained decisions trees. In other embodiments, the service valuation model may be a trained neural network with various computational layers to correlate the delivery parameters with delivery effort. The service valuation model may then output an adjusted predicted active time value for deliveries in a given location or area. The active time value may be adjusted by the service valuation model so that a courier acceptance rate is at a desired rate. However, it should be understood that various other metrics may be used by the service valuation model to determine the appropriate active time value. For example, an average time duration between the order created event 212-B and order pairing 222 may be used to determine the effectiveness of an active time event.

The adjusted active time value may then be used to determine service value amounts for subsequent delivery opportunities at 801. In some embodiments, an updated active time value may be generated for each predefined location or geographic area. In some embodiments the active time value may be adjusted at equal time intervals, such as at 30 minute intervals. In other embodiments, an updated active time value may be generated for each rejected order before the delivery opportunity for such order is transmitted to a subsequent courier.

Figure 9A:
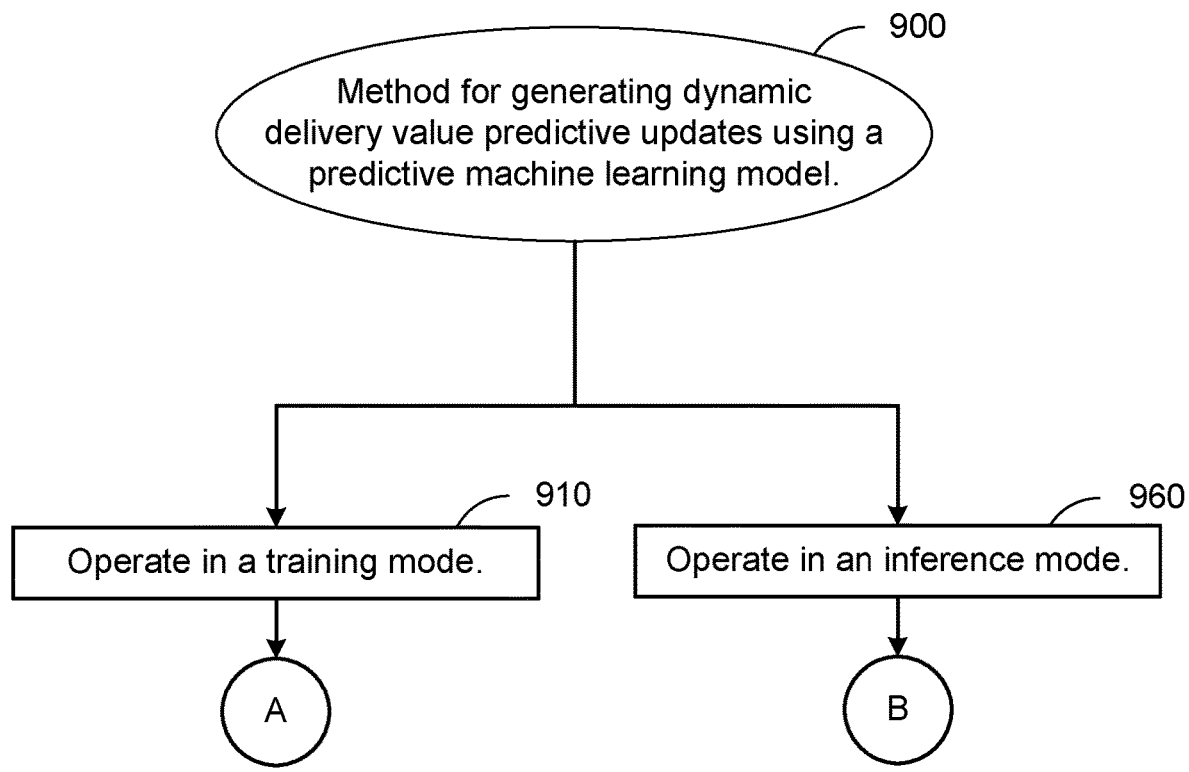
FIGS. 9A-9C illustrate an example method for generating dynamic delivery value predictive updates using a predictive machine learning model, in accordance with one or more embodiments.
Figure 9B:
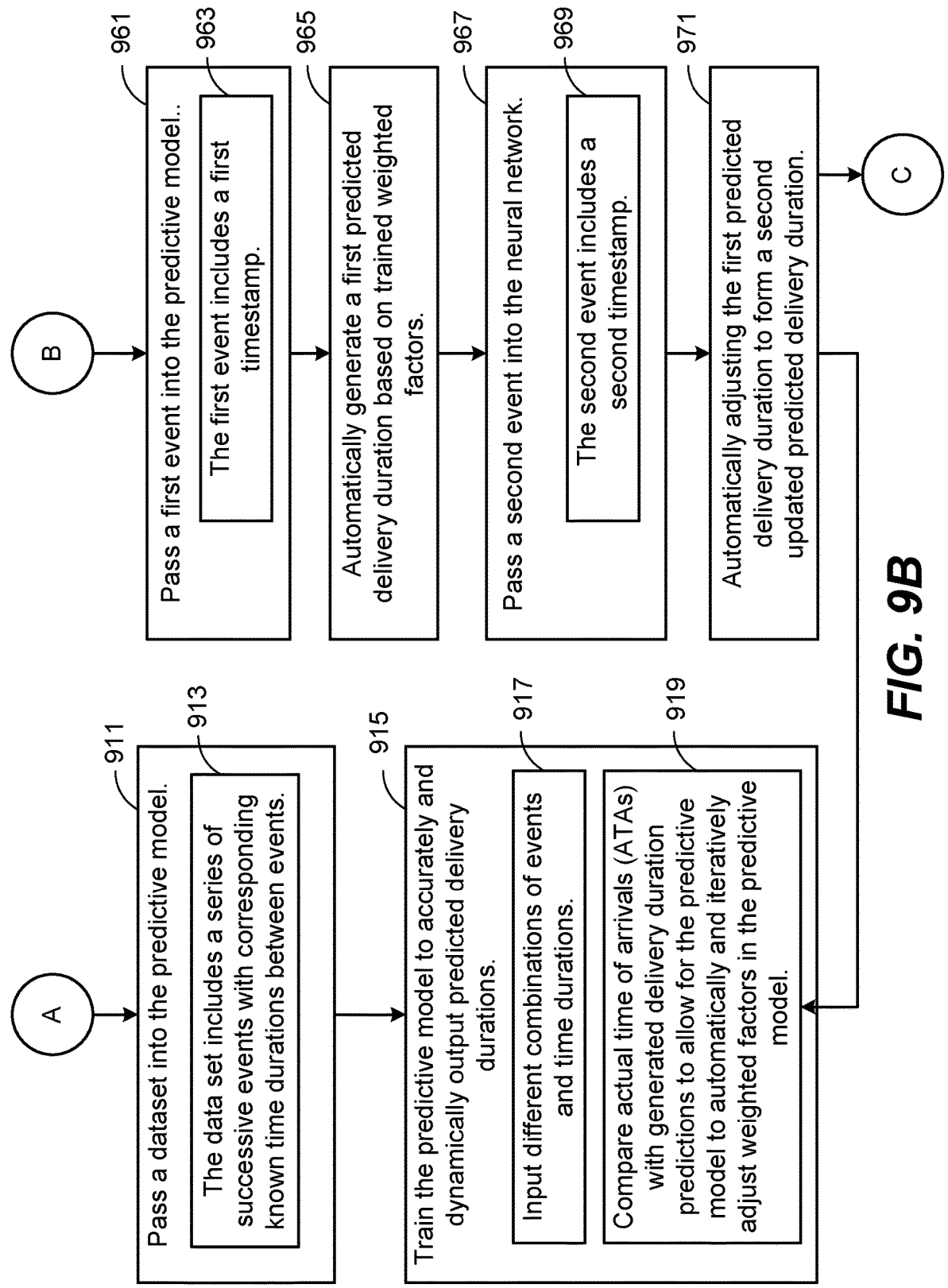
Figure 9C:
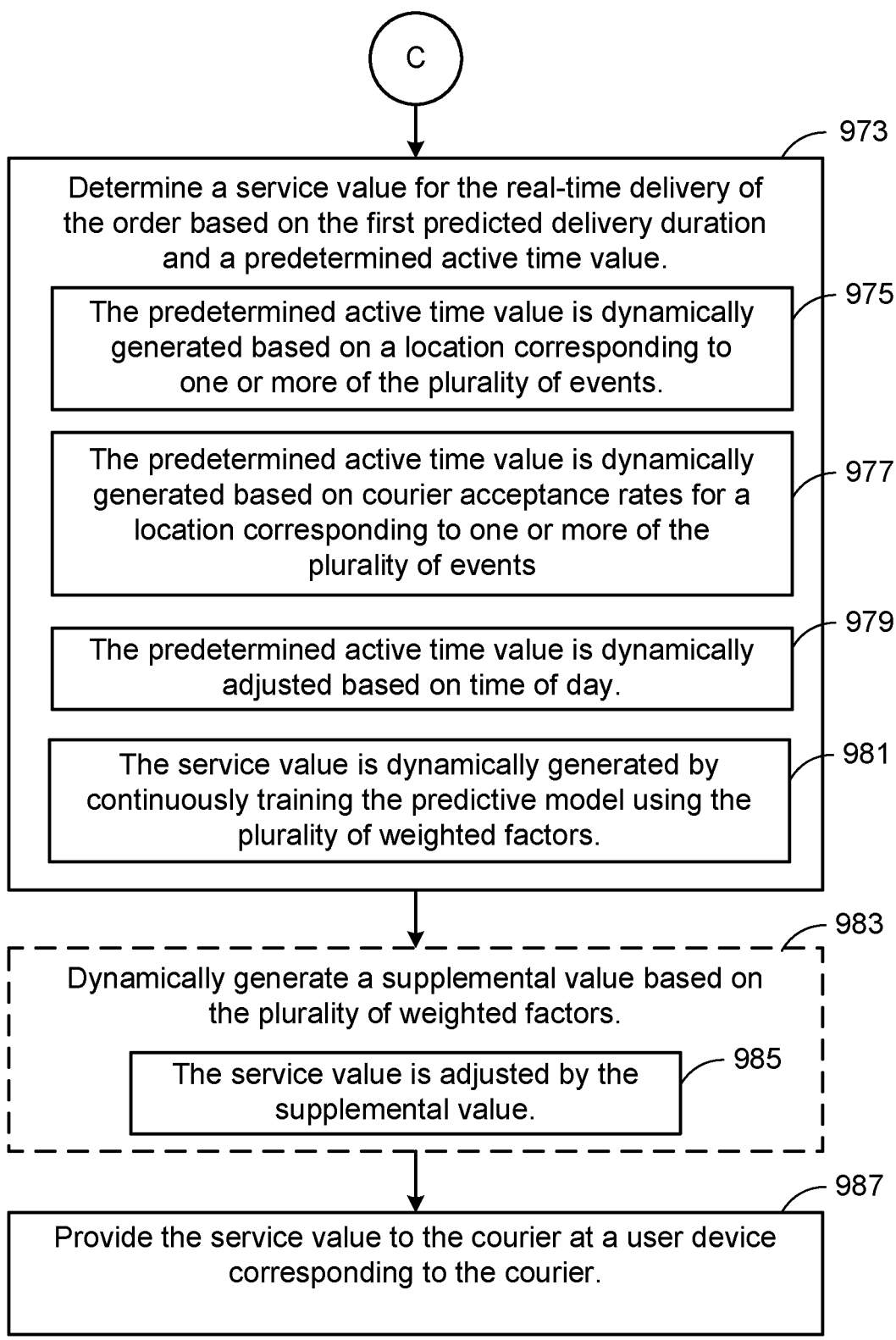

With reference to FIGS. 9A-9C, shown an example method 900 for generating dynamic delivery value predictive updates using a predictive machine learning model, in accordance with one or more embodiments. In certain embodiments, the predictive machine learning model may be a predictive event model and/or a service valuation model, and comprise one or more computational layers or chained decision trees. FIG. 9B illustrates an example of operations of the predictive model in the training mode 910 and inference mode 960, in accordance with one or more embodiments.

When operating in the training mode 910, a dataset 913 is passed into the predictive model at operation 911. In some embodiments, the dataset 913 includes a series of successive events with corresponding known time durations between events. In some embodiments, the successive events in the dataset 913 may be referred to as training events. In some embodiments, the successive events may include one or more of the events described with reference to FIG. 2. For example, a first training event of the successive events includes a placement of the order at a merchant by a customer, a second training event of the successive events includes confirmation of receipt of the order by the merchant, a third training event of the successive events includes confirmation of completion of the order by the merchant, a fourth training event of the successive events includes pickup of the order by a courier, and a fifth training event of the successive events includes completion of delivery of the order to the customer.

Data sets 913 may also include various parameters corresponding to the combinations of events and time durations. In some embodiments, the parameters may correspond to factors that correlate with the time durations. In various embodiments, the parameters may include one or more parameters as described with reference to FIG. 5. Such factors may be weighted. In some embodiments, the factors are weighted based on predetermined or known data.

At operation 915, the predictive model is trained to accurately and dynamically output predicted delivery durations, such as PDDs. In some embodiments, training the predictive model includes inputting (917) different combinations of events and time durations. In some embodiments, the predictive models not provided with the known time durations. The predictive model may generate ETA predictions for subsequent events based on the input events and parameters. In some embodiments, actual time of arrivals (ATAs) for the subsequent events are then provided. In some embodiments, training the predictive model further includes comparing (919) actual time of arrivals with generated delivery duration predictions to allow for the predictive model to automatically and iteratively adjust weighted factors in the predictive model. In various embodiments, the predictive delivery durations are determined based on timestamps corresponding to ETAs for various delivery events.

In some embodiments, the predictive model may be determined to be sufficiently trained once a predetermined number of training data sets have been run through the predictive model. In other embodiments, the predictive model may be determined to be sufficiently trained when the difference between a number of ETA predictions and corresponding ATAs fall within a predetermined threshold. For example, a predictive model may be sufficiently trained when 90% of output ETA predictions fall within a 2 minute range of the known corresponding ATA.

When operating in the inference mode 960, a first event 963 is passed into the predictive model at operation 961. The first event 963 may include a first timestamp. The first event 963 may be any one of various events previously described with reference to FIG. 2. The first timestamp may correspond to a first ATA for the first event 963. Once input into the various computational layers of the predictive model, a first predicted delivery duration is automatically generated based on trained weighted factors at operation 965. As previously described, the first predicted delivery duration (PDD) may correspond to the estimated time for the order to be delivered, such as at order delivery 232.

In some embodiments, subsequent delivery events may be input into the predictive model to update the ETA estimates and predictive delivery duration. For example, a second event 969 may be passed into the predictive model at operation 967. The second event 969 may include a second timestamp. The second event 967 may be any one of various events previously described with reference to FIG. 2. For example, the second event 967 may be the subsequent delivery event to the first event 963. The second timestamp may correspond to a second ATA for the second event. Once input into the various computational layers of the predictive model, the first predicted delivery duration is automatically adjusted to form a second predicted delivery duration at operation 971. Operations 967 and 971 are optional and may not be implemented in various described embodiments.

In some embodiments, the predictive model comprises of plurality of subnetworks. Each sub-network may correspond to a time duration between the successive events. For example, a first sub-network may correspond to a time duration between the first event and the second event, a second sub-network may correspond to a time duration between the second event and a third event, and so on. In some embodiments, the output of the first sub-network may be input into the second subnetwork to generate an ETA prediction for the third event and/or order delivery. In other embodiments, the output of each sub-network is aggregated to adjust the ETA prediction to form the second updated ETA prediction.

In some embodiments, the ATA for the second event may be compared to the first ETA prediction generated to allow for the predictive model to automatically and iteratively adjust weighted factors in the predictive model, such as at operation 919. In some embodiments, the ATA for the second event may be input into the first sub-network to automatically and iteratively adjust weighted factors in the first sub-network. Operations 967 and 971 may be optional operations that may be excluded in particular embodiments.

FIG. 9C illustrates an example of operations of the predictive model in determining a service value amount for the real-time delivery of an order corresponding to the first and second events. At operation 973, a service value for the real-time delivery of the order is determined based on the first predicted delivery duration and a predetermined active time value. In some embodiments, the service value amount is dynamically generated by continuously training (981) the predictive model using the plurality of weighted factors. The trained model may be the service valuation model previously described.

In some embodiments, the predetermined active time value is dynamically generated based on a location 975 corresponding to one or more of the plurality of events. In some embodiments, the predetermined active time value is dynamically generated based on courier acceptance rates 977 for a location corresponding to one or more of the plurality of events. In some embodiments, the predetermined active time value is dynamically adjusted based on time of day 979. For example, a predetermined active time value may be adjusted every 30 minutes based on various system conditions, such as courier acceptance rate.

In some embodiments, a supplemental value 985 may be dynamically generated based on the plurality of weighted factors at operation 983. The service value may be adjusted by the supplemental value 985. In some embodiments, the generation of a supplemental value amount 985 at operation 983 is an optional step.

At operation 987, the service value is provided to the courier at a user device corresponding to the courier, such as courier device 622. The service value may be transmitted to the courier device along with a corresponding delivery opportunity for the courier to accept or reject. For example, the service value may be transmitted as a Fair Value Offer Amount to the courier device. In some embodiments, the Fair Value Offer Amount corresponds to the service value as adjusted by the supplemental value amount.

Figure 10:
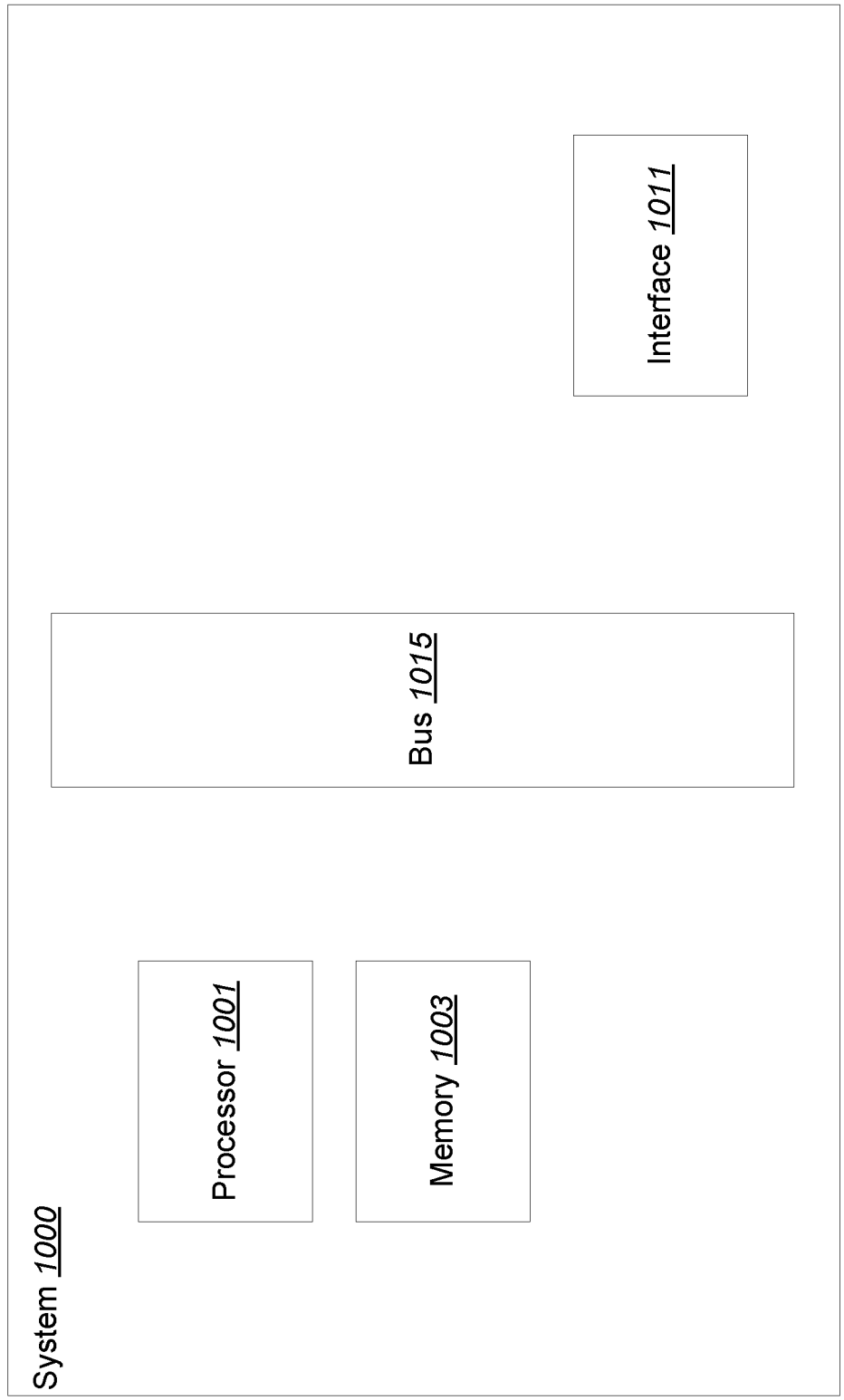
FIG. 10 illustrates a particular example of a computer system that can be used with various embodiments of the present disclosure.

Various computing devices can implement the methods described. For instance, a mobile device, computer system, etc. can be used to generate dynamic ETA predictive updates. With reference to FIG. 10, shown is a particular example of a computer system 1000 that can be used to implement particular examples of the present disclosure. According to particular example embodiments, a system 1000 suitable for implementing particular embodiments of the present disclosure includes a processor 1001, a memory 1003, an interface 1011, and a bus 1015 (e.g., a PCI bus). When acting under the control of appropriate software or firmware, the processor 1001 is responsible for processing inputs through various computational layers or algorithms in a predictive model. In some embodiments, the processor is responsible for updating the parameters of each computational layer using algorithms, including but not limited to, a stochastic gradient descent algorithm and a backpropagation algorithm. Various specially configured devices can also be used in place of a processor 1001 or in addition to processor 1001. The complete implementation can also be done in custom hardware.

The interface 1011 is typically configured to send and receive data packets or data segments over a network. Particular examples of interfaces the device supports include Ethernet interfaces, frame relay interfaces, cable interfaces, DSL interfaces, token ring interfaces, and the like. The interface 1011 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions for operations including training a predictive model, generating ETA predictions such as in method 500, and generating delivery service values such as in method 900. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method comprising:
    training a predictive model to output an active time value using a first dataset, the first dataset including a first set of pairing responses and parameters associated with orders corresponding to the first set of pairing responses;
    receiving a second set of pairing responses associated with pairing notifications transmitted to a plurality of courier devices, wherein each pairing notification includes a service value based on the active time value and a respective predicted delivery duration, wherein the second set of pairing responses indicates a courier acceptance rate; and
    inputting a second dataset into the predictive model to generate an updated active time value when the courier acceptance rate is above or below a predetermined threshold range, wherein the second dataset comprises the second set of pairing responses and parameters associated with orders corresponding to the second set of pairing responses.

2. The method of claim 1, wherein the predictive model generates the updated active time value for a location associated with the orders corresponding to the second set of pairing responses.

3. The method of claim 1, wherein the predictive model generates the updated active time value based on the courier acceptance rate associated with the second set of pairing responses.

4. The method of claim 1, wherein the updated active time value is dynamically adjusted based on a time of day.

5. The method of claim 1, further comprising generating a supplemental value amount based on a plurality of weighted factors, wherein the service value is adjusted by the supplemental value amount.

6. The method of claim 1, wherein the predictive model employs a gradient boosted machine.

7. The method of claim 1, wherein the predictive model is continuously trained using additional datasets comprising delivery parameters associated with subsequent orders.

8. The method of claim 1, wherein the parameters associated with orders corresponding to the first set of pairing responses includes one or more of the following:
    sub-totals of the respective orders corresponding to the first set of pairing responses,
    types of items in the respective orders corresponding to the first set of pairing responses,
    a number of items in the respective orders corresponding to the first set of pairing responses, and
    a number of pending orders at associated restaurants.

9. The method of claim 1, wherein the parameters associated with orders corresponding to the first set of pairing responses are received from one or more of the following: the plurality of courier devices, a restaurant device, and a customer device.

10. A system comprising:
    one or more processors;
    memory; and
    one or more programs stored in the memory, the one or more programs comprising instructions for:
        training a predictive model to output an active time value using a first dataset, the first dataset including a first set of pairing responses and parameters associated with orders corresponding to the first set of pairing responses;
        receiving a second set of pairing responses associated with pairing notifications transmitted to a plurality of courier devices, wherein each pairing notification includes a service value based on the active time value and a respective predicted delivery duration, wherein the second set of pairing responses indicates a courier acceptance rate; and
        inputting a second dataset into the predictive model to generate an updated active time value when the courier acceptance rate is above or below a predetermined threshold range, wherein the second dataset comprises the second set of pairing responses and parameters associated with orders corresponding to the second set of pairing notification responses.

11. The system of claim 10, wherein the predictive model generates the updated active time value for a location associated with the orders corresponding to the second set of pairing responses.

12. The system of claim 10, wherein the predictive model generates the updated active time value based on the courier acceptance rate associated with the second set of pairing responses.

13. The system of claim 10, wherein the updated active time value is dynamically adjusted based on a time of day.

14. The system of claim 10, wherein the one or more programs further comprise instructions for generating a supplemental value amount based on a plurality of weighted factors, wherein the service value is adjusted by the supplemental value amount.

15. The system of claim 10, wherein the predictive model employs a gradient boosted machine.

16. The system of claim 10, wherein the predictive model is continuously trained using additional datasets comprising delivery parameters associated with subsequent orders.

17. The system of claim 10, wherein the parameters associated with orders corresponding to the first set of pairing responses includes one or more of the following:
    sub-totals of the respective orders corresponding to the first set of pairing responses,
    types of items in the respective orders corresponding to the first set of pairing responses,
    a number of items in the respective orders corresponding to the first set of pairing responses, and
    a number of pending orders at associated restaurants.

18. The system of claim 10, wherein the parameters associated with orders corresponding to the first set of pairing responses are received from one or more of the following: the plurality of courier devices, a restaurant device, and a customer device.

19. A non-transitory computer readable medium storing one or more programs configured for execution by a computer, the one or more programs comprising instructions for:
    training a predictive model to output an active time value using a first dataset, the first dataset including a first set of pairing responses and parameters associated with orders corresponding to the first set of pairing responses;
    receiving a second set of pairing responses associated with pairing notifications transmitted to a plurality of courier devices, wherein each pairing notification includes a service value based on the active time value and a respective predicted delivery duration, wherein the second set of pairing responses indicates a courier acceptance rate; and inputting a second dataset into the predictive model to generate an updated active time value when the courier acceptance rate is above or below a predetermined threshold range, wherein the second dataset comprises the second set of pairing responses and parameters associated with orders corresponding to the second set of pairing responses.

20. The non-transitory computer readable medium of claim 19, wherein the parameters associated with orders corresponding to the first set of pairing responses includes one or more of the following:

sub-totals of the respective orders corresponding to the first set of pairing responses, types of items in the respective orders corresponding to the first set of pairing responses, a number of items in the respective order corresponding to the first set of pairing responses, and quantities of pending orders at associated restaurants.

\* \* \* \* \*